US006687319B1

United States Patent
Perino et al.

(10) Patent No.: US 6,687,319 B1
(45) Date of Patent: Feb. 3, 2004

(54) SPREAD SPECTRUM CLOCKING OF DIGITAL SIGNALS

(75) Inventors: Donald V. Perino, Los Altos, CA (US); Haw-Jyh Liaw, Sunnyvale, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 09/245,140

(22) Filed: Feb. 4, 1999

(51) Int. Cl.[7] .............................. H04L 7/00; H04B 1/69; H04B 1/707
(52) U.S. Cl. ...................... 375/367; 375/130; 375/141
(58) Field of Search ................. 375/140, 141, 375/144, 145, 146, 147, 130, 133, 134, 137, 367, 148, 149; 713/500, 501; 370/350, 503, 515; 327/164, 291, 298, 299

(56) References Cited

U.S. PATENT DOCUMENTS

| | | | |
|---|---|---|---|
| 5,062,122 A | * 10/1991 | Pham et al. ................ | 375/130 |
| 5,303,258 A | * 4/1994 | Nakamura .................. | 375/142 |
| 5,488,627 A | 1/1996 | Hardin et al. .............. | 375/139 |
| 5,610,955 A | 3/1997 | Bland ........................ | 375/376 |
| 5,631,920 A | 5/1997 | Hardin ...................... | 375/130 |
| 5,659,587 A | 8/1997 | Knierim .................... | 375/376 |
| 5,889,819 A | * 3/1999 | Arnett ....................... | 375/362 |
| 5,909,144 A | * 6/1999 | Puckette et al. ............ | 375/130 |
| 5,909,472 A | * 6/1999 | Arnett ....................... | 375/362 |

OTHER PUBLICATIONS

McCune and Goedjen, 1996, "Spectrum Spread Clocking: Benefits and Tradeoffs for High Performance Design," *High–Performance System Design Conference*, pp. 1–1 to 1–20.

* cited by examiner

*Primary Examiner*—Betsy L. Deppe
(74) *Attorney, Agent, or Firm*—Gary S. Williams; Pennie & Edmonds LLP

(57) ABSTRACT

A clock signal desired to be transmitted to various components of the electronic system is combined with a noise signal to generate a spread spectrum clock signal which, in turn, is distributed with an associated reference signal to selected components of the system using two-channel communication links. A receiving circuit within each of the selected components recovers the original clock signal from the spread spectrum clock signal and its associated reference signal. In one embodiment, the clock signal is combined with the noise signal in an exclusive-OR logic gate to generate a spread spectrum clock signal which is distributed to receiving components using a first channel. The noise signal is transmitted as the reference signal using the second channel. The two channel signals are combined in an exclusive-OR gate of one or more receiving circuits to recover the clock signal. In other embodiments, transmission of the clock signal is alternated between the two channels in accordance with the logic state of the noise signal. Here, the two channel signals are combined in an OR logic gate of each receiving circuit to recover the clock signal.

29 Claims, 21 Drawing Sheets

SPREAD SPECTRUM CLOCKING OF DIGITAL SIGNALS

This invention relates generally to digital circuits and specifically to a clock signal having reduced measurable electromagnetic interference emissions.

BACKGROUND OF THE INVENTION

Electronic devices generate electromagnetic interference (EMI) when operating. The EMI generated by one electronic device may adversely affect the operation of another electronic device. In order to minimize adverse effects of EMI upon other electronic devices, the United States and other countries have adopted standards which limit the amount of energy an electronic device may radiate at any given frequency.

Electronic devices having digital circuitry typically require a clock signal of some frequency for operation. In many such devices, long traces or wires are used to route the clock signal to various integrated circuit (IC) components. These long wires or traces act as antennas which, in turn, radiate energy at the clock signal frequency and its harmonics. Since antennas radiate more efficiently as wavelength becomes smaller with respect to antenna length, the amount of energy so radiated increases as the clock frequency increases. Consequently, in sophisticated electronic devices such as, for instance, personal computers, where clock frequencies are approaching gigahertz speeds, EMI is increasingly problematic and often prevents electronic devices from being sold to the public because of failure to meet FCC EMI limits.

FIG. 1 shows a spectral plot of energy versus frequency for an ideal clock of frequency $f_{CLK}$. All of the EMI energy is concentrated at the clock frequency $f_{CLK}$ (energy at harmonics of the clock frequency are not shown for simplicity). Since EMI energy exceeds FCC limits at the clock frequency for this clock, a device included with this much radiated energy would not meet FCC regulations. A well known technique to reduce the peak EMI energy at the clock frequency (and its harmonics) is to use frequency hopping spread spectrum techniques to spread the energy across the frequency spectrum, as shown in FIG. 2. Spectrum spreading is commonly used in radio frequency communication to facilitate high-resolution ranging, multiple access, jamming resistant waveforms, and energy density reduction.

Conventional techniques for generating a spread spectrum clock signal typically involve varying the frequency of the clock signal in a periodic manner between two predetermined frequencies. For instance, in U.S. Pat. No. 5,610,955, a phased-locked loop (PLL) circuit receiving as input a signal at a reference frequency is used with variable feedback to generate a spread spectrum clock. A first divider circuit coupled to the PLL input divides the reference frequency by a first variable integer M, and a second divider circuit coupled to the PLL output divides the output frequency by a second variable integer N, where the first and second integers M and N are periodically varied by a control circuit, so as to cause the frequency of the output signal to vary precisely between two predetermined frequencies. U.S. Pat. No. 5,631,920 discloses a slightly different approach, whereby the frequency of a clock signal is modulated according to a periodic waveform having a predetermined period and a predetermined frequency profile.

Although conventional techniques for generating a spread spectrum clock in order to reduce EMI spikes at the harmonic frequencies are often sufficient, ever increasing clock speeds require continually improving EMI spreading techniques. Further, such conventional techniques are not suitable for all systems. For example, the time-varying clock frequency techniques discussed above may not be suitable for systems which use PLLs, since PLLs require certain bandwidth to track the clock.

SUMMARY OF THE INVENTION

A direct sequence spread spectrum clock circuit is disclosed which reduces EMI of an electronic system. In accordance with the present invention, a clock signal desired to be distributed to various components of the electronic system is combined with a noise signal to generate a spread spectrum clock signal. The spread spectrum clock signal and an associated transmitted reference signal are distributed to selected components of the system using two-channel communication links or by using synchronized pseudo-random number generators in each component. A receiving circuit within each of the selected components recovers the original clock signal from the spread spectrum clock signal and the reference signal. In some embodiments, synchronized code generators housed within transmitting and receiving components are employed.

The noise signal, being either random or pseudo-random, causes the resulting spread spectrum clock signal to be non-periodic. As a result, energy radiated by the spread spectrum clock signal is spread over a wide frequency band. Applicants have found that the non-periodic nature of the direct sequence spread spectrum clock signal waveform results in improved EMI reduction, as compared to conventional EMI reduction techniques discussed above.

In one embodiment, a clock signal is combined with the noise signal in an exclusive-OR logic gate to generate a spread spectrum clock signal which, in turn, is transmitted to receiving components using a first channel. The noise signal is transmitted as the reference signal using a second channel. The two channel signals are combined in an exclusive-OR gate of one or more receiving circuits to recover the clock signal.

In another embodiment, transmission of the clock signal is alternated between two channels in accordance with the logic state of the noise signal. Here, the two channel signals are combined in an OR logic gate of each receiving circuit to recover the clock signal. In yet another embodiment, transmission of the clock signal is alternated between the two channels according to the logic state of the noise signal, and transmission of a reference voltage signal is alternated between the two channels in a complementary manner. Here, the two channel signals are combined in a comparator circuit within each receiving circuit to recover the clock signal.

In still another embodiment, identical pseudo-random number generators are housed in the clock generator as well as in each receiving device. After being synchronized, the pseudo-random signal and the clock are combined in an exclusive-OR logic gate. The resulting spread spectrum clock signal is distributed on a single channel.

BRIEF DESCRIPTION OF THE DRAWINGS

FIG. 26b is a timing diagram of signals in the circuit shown in FIGS. 25 and 26a;

FIG. 27 is a graph illustrating a random noise signal generated by the pseudo-random number generator circuits shown in FIGS. 25 and 26a;

Like components in the Figures are similarly labeled.

DETAILED DESCRIPTION OF THE PREFERRED EMBODIMENTS

Embodiments of the present invention are described below in the context of the main memory of a personal computer. However, the present invention and the clock generator circuit embodiments shown in this document are applicable to virtually any electronic system or circuit that requires a clock. Thus, the present invention is not to be construed as limited to specific the examples provided herein.

Applicants have found that in many data processing systems, a substantial amount of EMI results from the periodic oscillations of clock signals that are transmitted over clock bus lines. Since information transmitted on data and address lines of an electronic device is typically random, rather than periodic, the EMI produced by data and address signals is usually substantially lower in amplitude than the EMI amplitude spikes associated with clock signals.

The present invention reduces the EMI generated by electronic devices by converting a clock signal into a non-periodic spread spectrum clock signal using a direct sequence spread spectrum technique, before the clock signal is transmitted to clock-dependent components of the device. The non-periodic spread spectrum clock and a reference signal are then transmitted to the clock-dependent components via a two-channel communication link. A clock decode circuit within each of the clock-dependent components recovers the original clock from the spread spectrum clock and the reference signal. In this manner, energy radiated by the clock is randomly spread over a wide frequency band, thereby reducing EMI energy spikes at the clock frequency harmonics. It is noted however, that EMI spike reduction techniques in accordance with the present invention may also be applied to data and address lines to ensure the randomness of those signals and thus to ensure that such signals do not generate EMI energy spikes.

Figure 3:
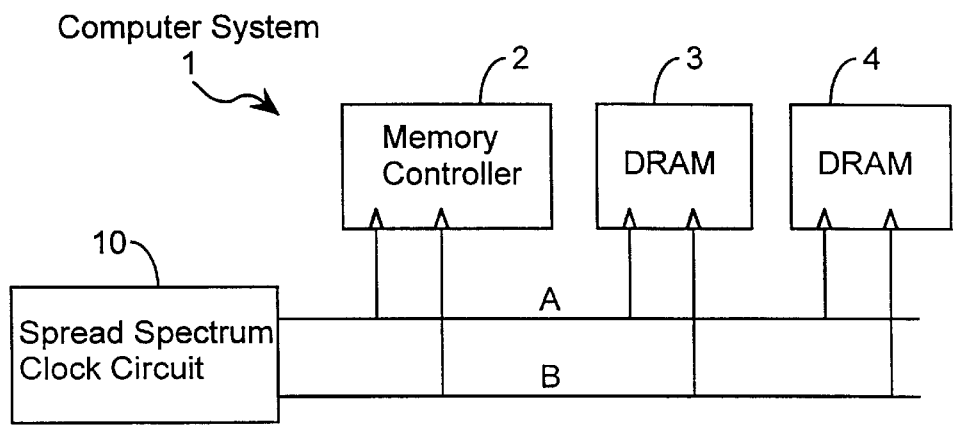
FIG. 3 is a block diagram of a spread spectrum clock circuit, in accordance with the present invention, as part of a computer.

Referring to FIG. 3, a spread spectrum clock 10 circuit in accordance with the present invention combines a non-periodic noise signal with a clock signal CLK to generate a spread spectrum clock $CLK_{ss}$. The clock circuit 10 transmits the spread spectrum clock $CLK_{ss}$ and an associated reference signal to a memory controller 2 and DRAM arrays 3–4 of an associated personal computer 1 via communication channels A and B which link the spread spectrum clock circuit 10 to the memory controller 2 and DRAM arrays 3–4, as well as other components (not shown for simplicity) of the computer 1 desired to receive the clock signal CLK. The channels A and B may be any suitable communications link between the spread spectrum clock circuit 10 and other components 2–4 of the computer 1 such as, for instance, electrically conductive wires or buses. The components 2–4 each include a receiving circuit to recover the original clock signal CLK from the spread spectrum clock $CLK_{ss}$ and reference signal received from channels A and B.

Figure 4:
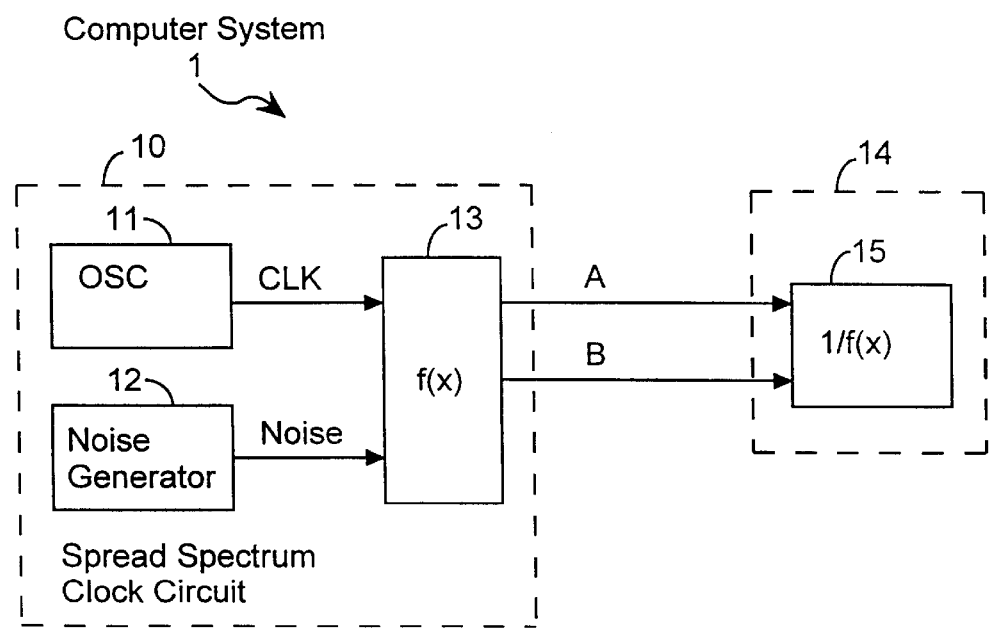
FIG. 4 is a block diagram of a spread spectrum clock circuit in accordance the present invention.

Referring to FIG. 4, the spread spectrum clock circuit 10 includes an oscillator 11, a noise generator 12, and a logic circuit 13. Logic circuit 13 is also called a generator because it generates the spread spectrum clock signal. The oscillator 11 provides a clock signal CLK, generated in a well known manner and having a predetermined frequency $f_{CLK}$, to a first input terminal of the generator 13. The noise generator 12 provides a non-periodic bit sequence to a second input terminal of the generator 13. The non-periodic bit sequence, hereinafter referred to as a Noise signal, may be either a purely random or a pseudo-random signal that has the form of a sequence of "0" and "1" bits. For instance, in one embodiment the noise generator 12 is a conventional pseudo-random number generator (identified by the label PRNG in some of the later figures) formed using an n-bit shift register having a modulo-2 adder in a feedback loop tapped between two of the registers. Generator 13 performs a clock generation function f(x) on the signals received at its input terminals, i.e., on the CLK and Noise signals, to provide first and second signals on channels A and B via its output terminals.

Figure 1:
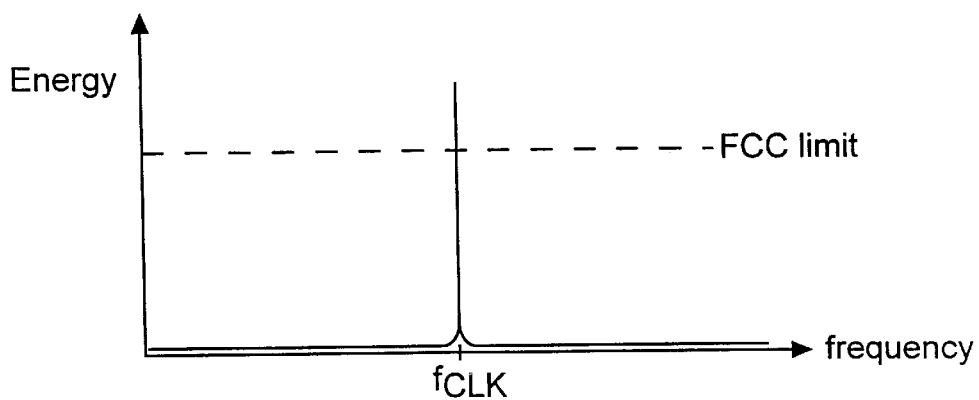
FIG. 1 is a graph of energy versus frequency for an ideal clock signal.
Figure 2:
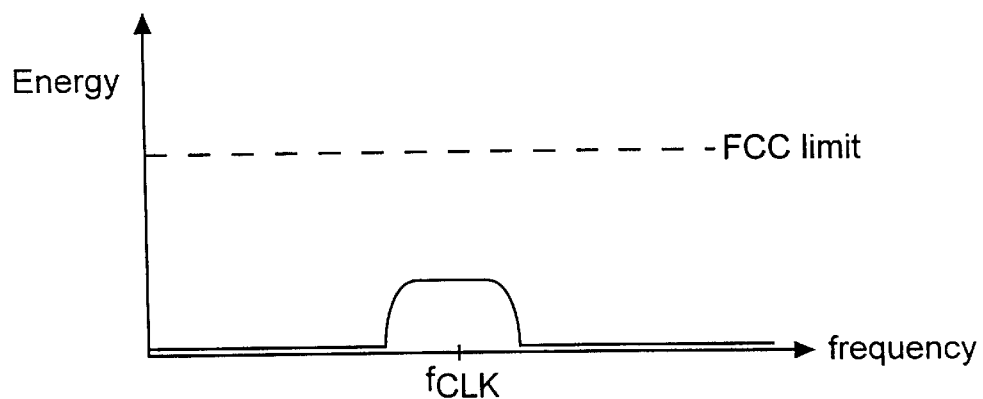
FIG. 2 is a graph of energy versus frequency for a frequency hopped spread spectrum clock signal.

A clock receiving circuit 14 situated within each of the components 2–4 (FIG. 1) includes a logic circuit 15 having input terminals coupled to channels A and B. The circuit 15 performs an inverse function (also called a clock recovery function) 1/f(x) on the signals received from channels A and B and thereby recovers the clock signal CLK. Since electromagnetic fields combine according to Maxwell's equations, in which there is a linear relationship between the source point and the field point, in some embodiments it is advantageous to have the functions f(x) and 1/f(x) be non-linear. In this manner, the radiated emissions from channels A and B cannot accidentally combine to form a clock-like signal. For instance, an exclusive-OR logic gate may provide the desired non-linear function. In other embodiments, it may be deemed unlikely that radiation will accidentally combine in a sufficiently constructive manner to cause interference. Since non-linear circuits, such as exclusive-OR gates, are known to sometimes produce clock signals having less than a perfect duty cycle, in some embodiments it may be advantageous to use linear clock generation and clock recovery functions.

Figure 5:
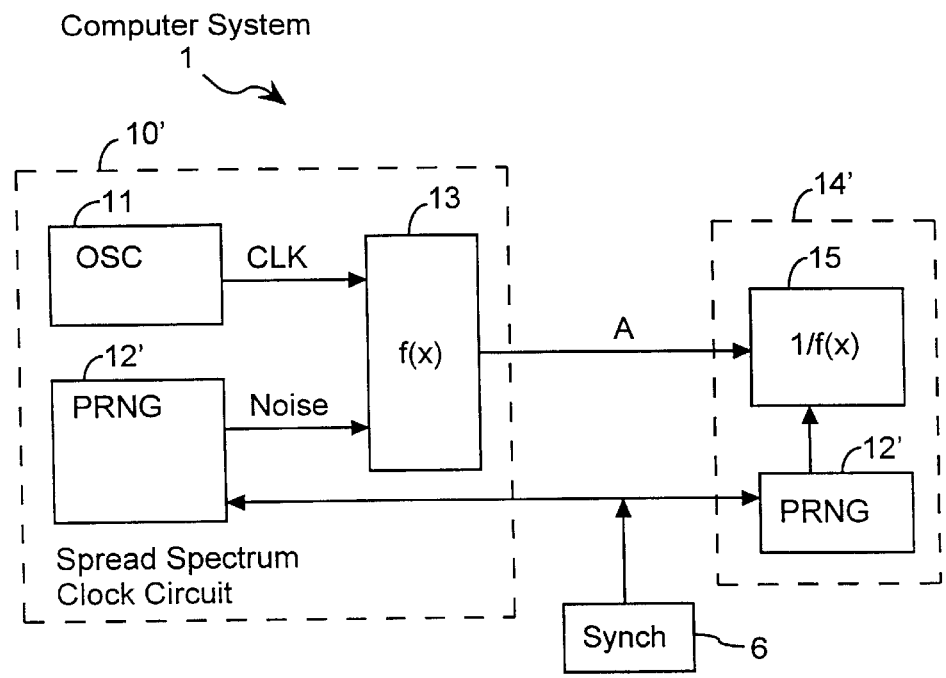
FIG. 5 is a block diagram of a spread spectrum clock circuit in accordance with an alternate embodiment of the present invention.

FIG. 5 shows an alternate embodiment wherein the spread spectrum clock circuit 10' and receiving circuit(s) 14' each include a synchronized pseudo-random number generator (PRNG) 12'. A synchronization circuit 6 provides a synchronization code to both pseudo-random number generators 12' so that identical Noise signals are provided to the f(x) function circuit 13 and to the 1/f(x) function circuit 15. More specifically, each of the noise generators 12' responds to receipt of a synchronization signal (e.g., a pulse) by resetting to a predefined start state. As a result, each noise generator 12' generates identical Noise signals so long as both noise generators 12' are clocked at the same rate.

The logic circuit 13 combines the CLK signal and Noise signal according to the function f(x) in a manner similar to that described above to provide a spread spectrum clock signal to the clock recovery circuit 15 via channel A. The circuit 15 uses the Noise signal received from its associated number generator 12' to recover the clock signal CLK from the signal received from channel A in a manner similar to that described above.

Figure 6:
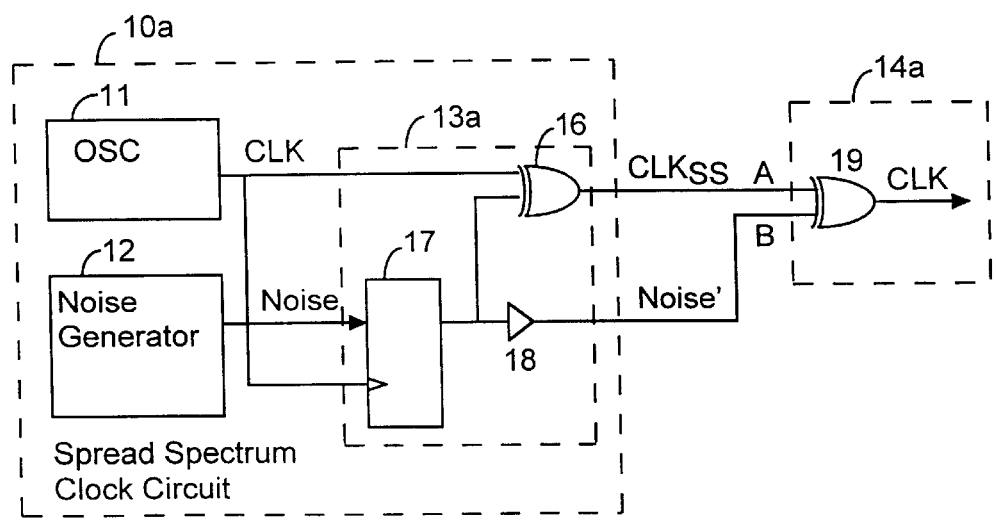
FIG. 6 is an example schematic of a spread spectrum clock circuit in accordance with a first embodiment of the circuit of FIG. 4.

Referring to FIG. 6, a first embodiment based upon the general circuit design of FIG. 4 is shown to have a logic circuit 13 that includes an exclusive-OR (XOR) logic gate 16, a data-type flip-flop 17, and a buffer 18. The oscillator 11 provides the periodic clock signal CLK to an input terminal of the XOR gate 16 and to the clock input of the flip-flop 17. The XOR gate 16 has an output terminal coupled to a first communication channel A. The noise generator 12 provides the non-periodic bit Noise signal to the input terminal of the flip-flop 17. The output terminal of the flip-flop 17 is coupled to the other input terminal of the XOR gate 16 and to a second communication channel B via a conventional buffer 18.

The clock receiving circuit 14a situated within each of the components 2–4 recovers the clock signal CLK from the information received from the spread spectrum clock circuit 10a via channels A and B. The receiving circuit 14a includes an XOR gate 19 having first and second input terminals coupled to respective channels A and B, and an output terminal upon which the recovered clock signal CLK appears.

Figure 7:
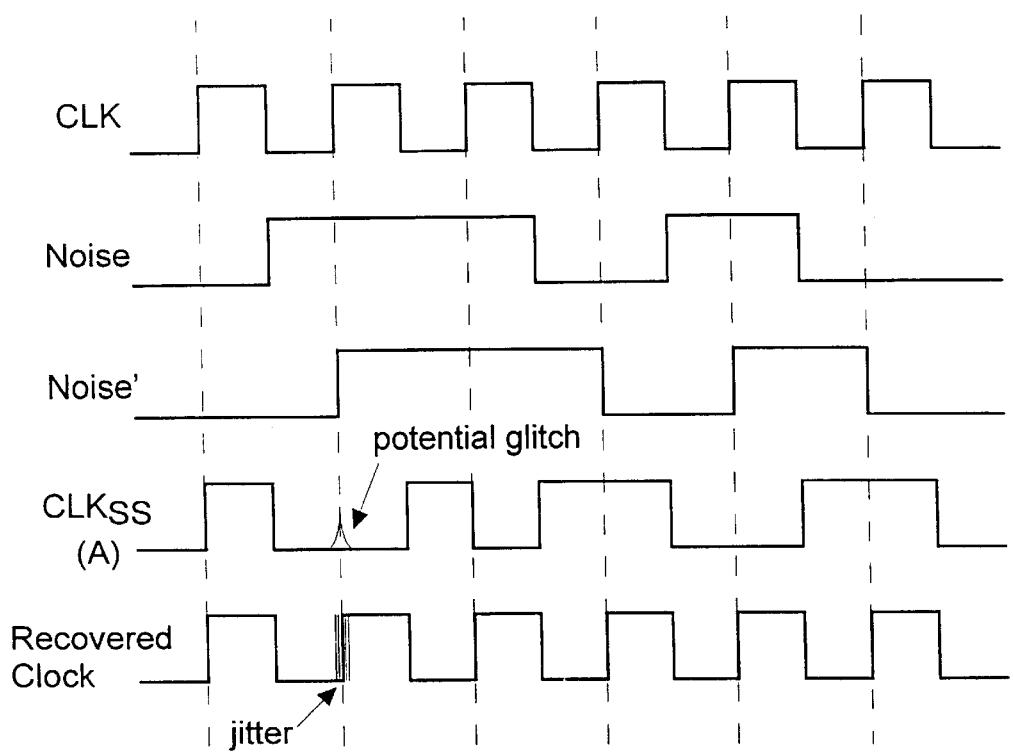
FIG. 7 is a timing diagram of various signals in the embodiment of FIG. 6.

Referring also to the timing diagram of FIG. 7, a sample non-periodic Noise signal generated by the noise generator 12 is clocked into the flip-flop 17 using the clock signal CLK. The resultant time-delayed noise signal Noise' is combined with the periodic clock signal CLK in the XOR gate 16 to generate a spread spectrum clock signal $CLK_{ss}$. The spread spectrum clock signal $CLK_{ss}$ and latched noise signal Noise' are transmitted to the receiving circuits 14a in each of the components 2–4 via channels A and B, respectively. The signals $CLK_{ss}$ and Noise' combined in XOR gate 19 to generate the original clock signal CLK.

FIG. 7 shows that the spread spectrum clock signal $CLK_{ss}$ may contain glitches, caused by transitions in the periodic clock signal reaching the XOR gate 16 (see FIG. 6) before corresponding changes in the Noise' signal. These glitches, if they occur, may result in "jitter" (i.e., uncertainty in timing) in the rising edges of the recovered clock signal. The falling edges of the recovered clock signal will generally have little or no jitter.

Figure 8:
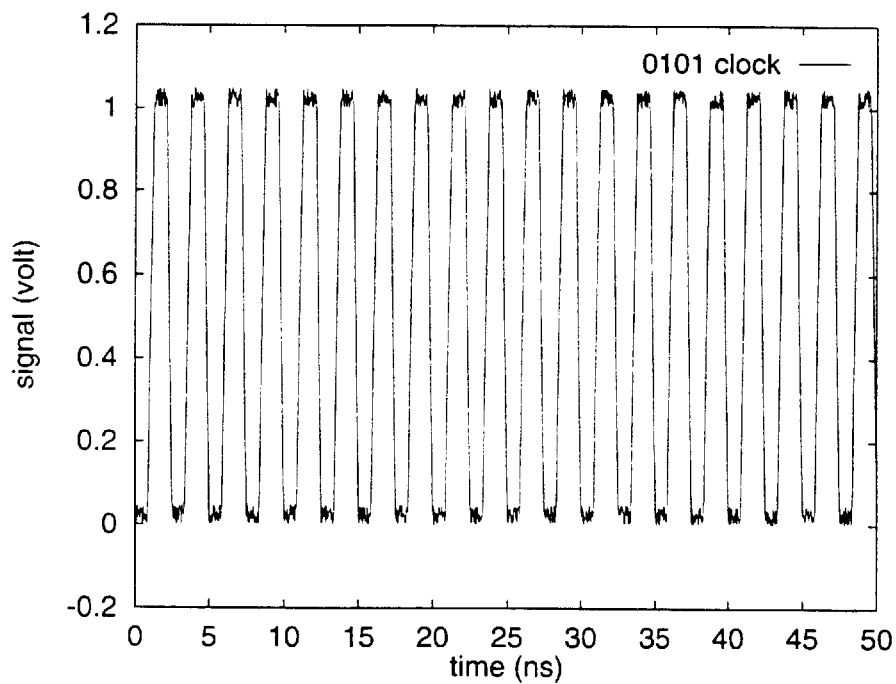
FIG. 8 is a time plot of a traditional clock signal, generated by an oscillator.
Figure 9:
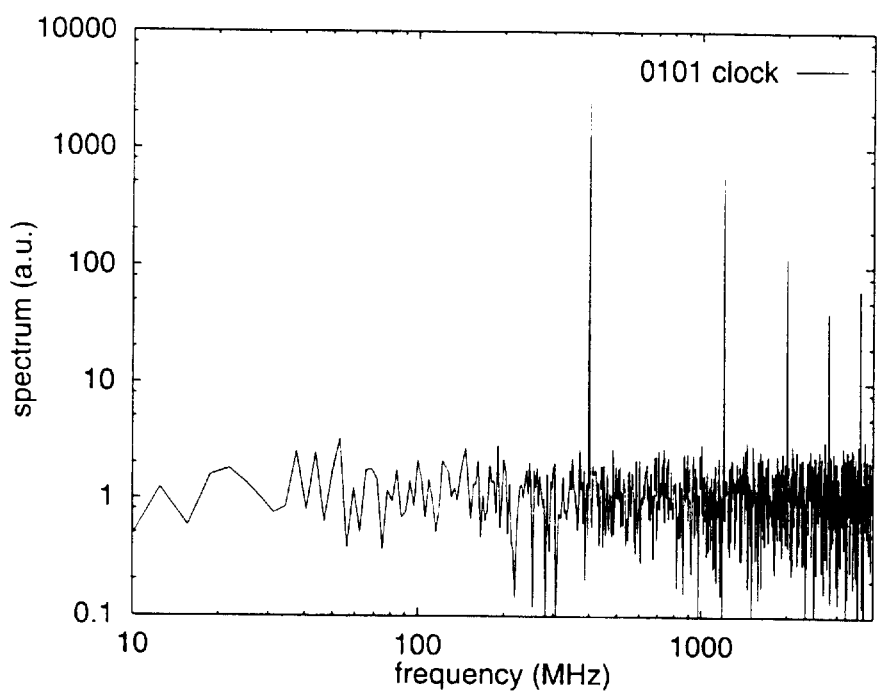
FIG. 9 is a graph of energy versus frequency for the clock signal of FIG. 8.

Transmitting a spread spectrum clock signal as described above results in a significant reduction in the peak EMI energy at harmonics of the clock frequency $f_{CLK}$. For instance, FIG. 8 shows a time plot of a traditional clock waveform, generated by an oscillator, having a frequency $f_{CLK}$ of 400 MHZ, and FIG. 9 shows a plot of energy versus frequency for the clock waveform of FIG. 8. As can be seen from FIG. 9, there are significant energy spikes (perhaps more accurately called impulses) at the fundamental frequency $f_{CLK}$ and at odd harmonics thereof. Here, the peak energy at the clock frequency $f_{CLK}$ exceeds 1000 a.u., where a.u. is an arbitrary unit of measure (units are omitted for clarity, since it is the energy of the original clock signal relative to the energy of a modified clock signal that is of concern here).

Figure 10:
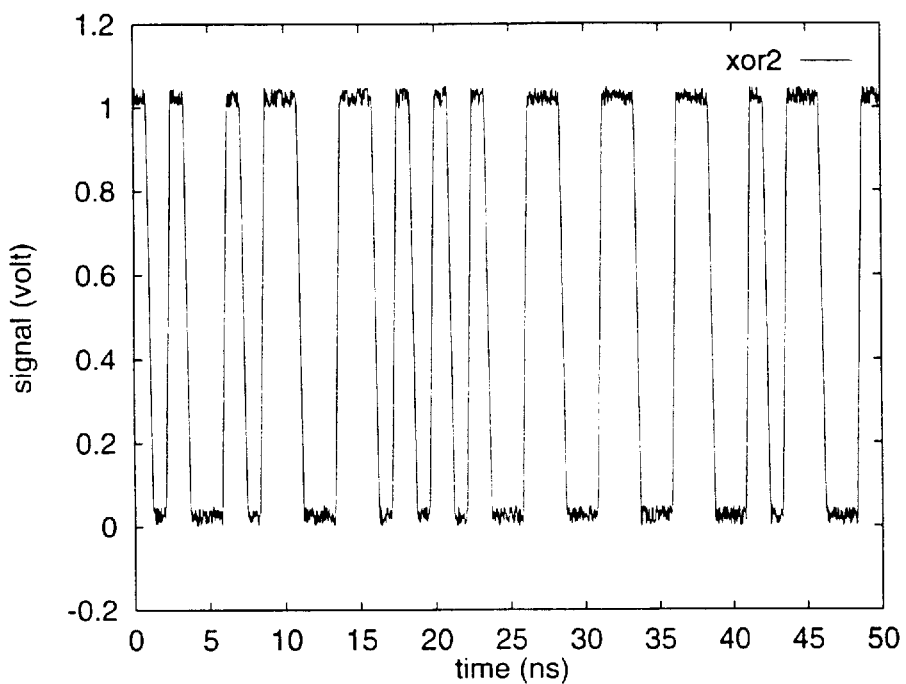
FIG. 10 is a time plot of a spread spectrum clock signal transmitted on channel A of the circuit shown in FIG. 6.
Figure 11:
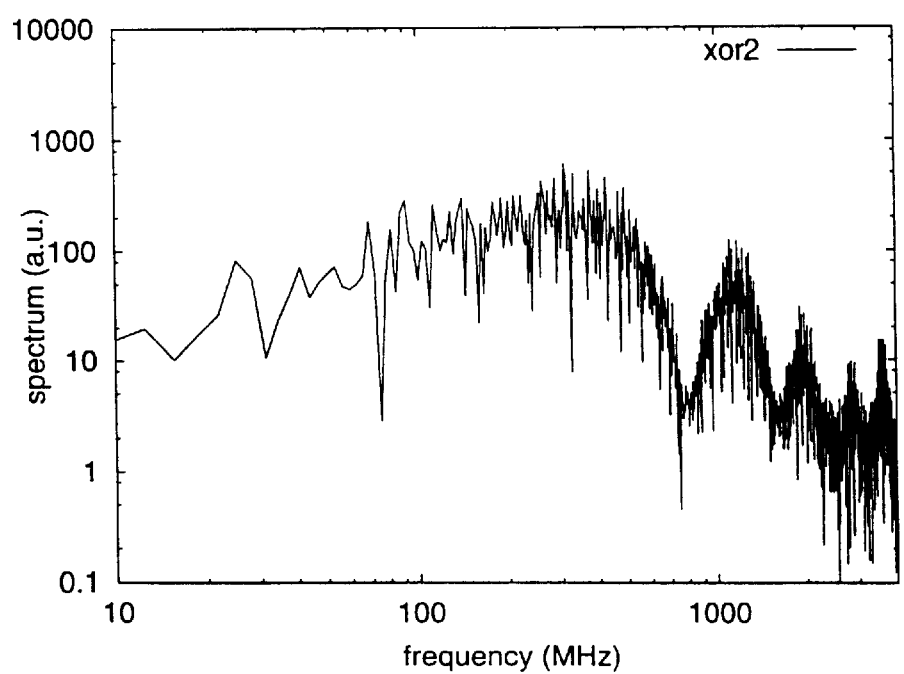
FIG. 11 is a graph of energy versus frequency for the spread spectrum clock signal of FIG. 10.

FIG. 10 shows a time plot of the spread spectrum clock signal CLKSS transmitted on channel A of the circuit shown in FIG. 6, and FIG. 11 shows a graph of energy versus frequency for the spread spectrum clock signal of FIG. 10, respectively. The spread spectrum clock signal shown in FIG. 10 has an fundamental frequency of 400 MHZ. The power spectral density of the spread spectrum clock signal on channel A is spread in over a wide frequency band and the maximum energy radiating from the spread spectrum clock signal $CLK_{ss}$ is only a few hundred a.u. This represents a nearly ten-fold reduction in peak energy, as compared with that of the original clock CLK (see FIG. 9).

Figure 12:
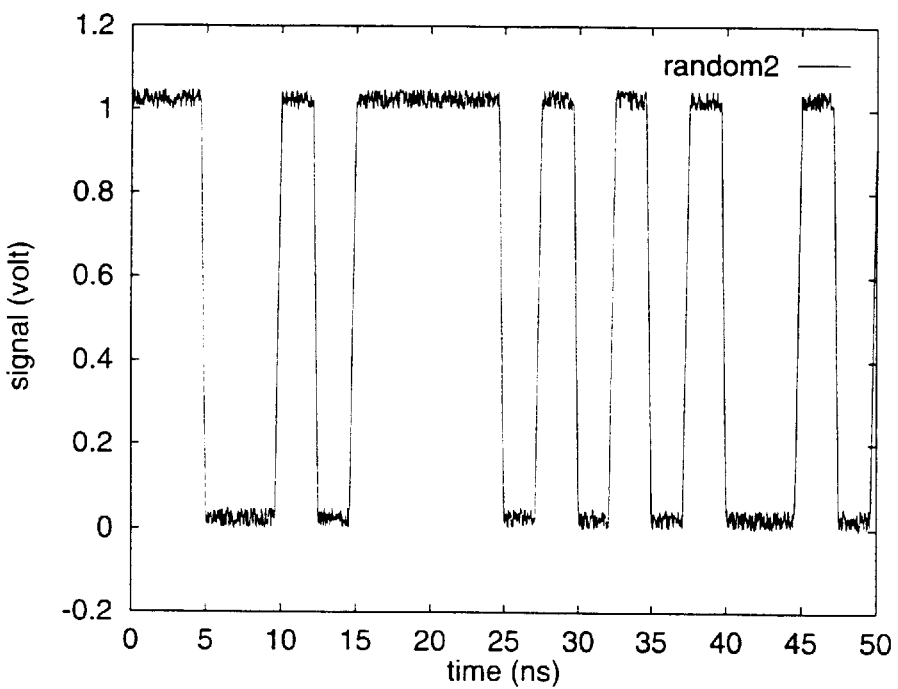
FIG. 12 is a time plot of a pseudo-random noise signal transmitted on channel B of the circuit shown in FIG. 6.
Figure 13:
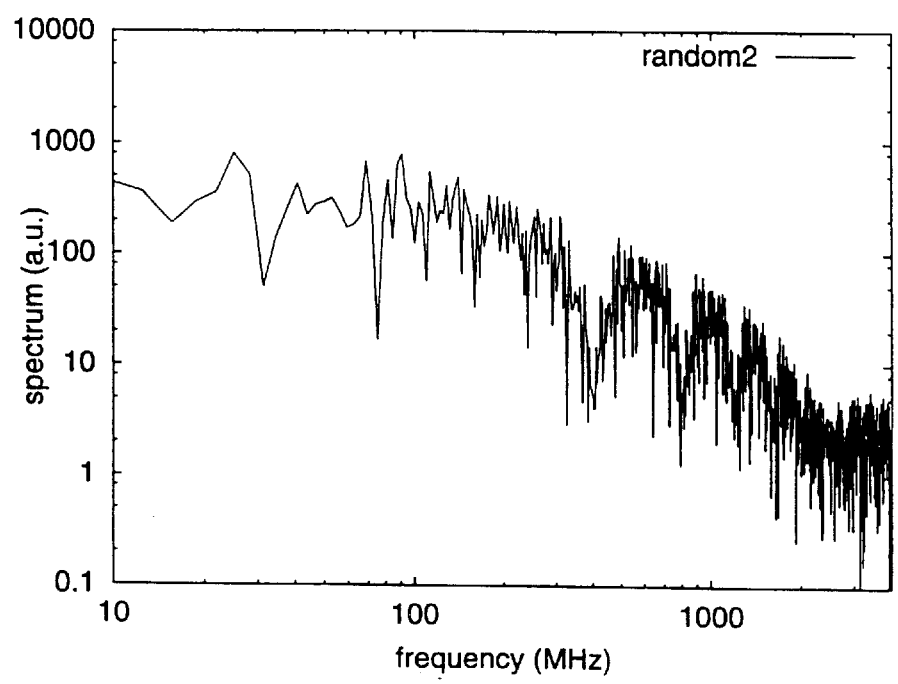
FIG. 13 is a graph of energy versus frequency for the pseudo-random noise signal of FIG. 12.

FIGS. 12 and 13 are similar to FIGS. 10 and 11, but pertain to the Noise' signal transmitted on channel B of FIG. 6. FIG. 12 shows a time plot of the pseudo-random Noise' signal transmitted on channel B of the circuit shown in FIG.

6, while FIG. 13 shows is a graph of energy versus frequency for the pseudo-random Noise' signal of FIG. 12. The power spectral density of the Noise' signal on channel B is concentrated a frequencies between 0 and half of the fundamental frequency of the clock signal.

Decoder Based Embodiment

Figure 14:
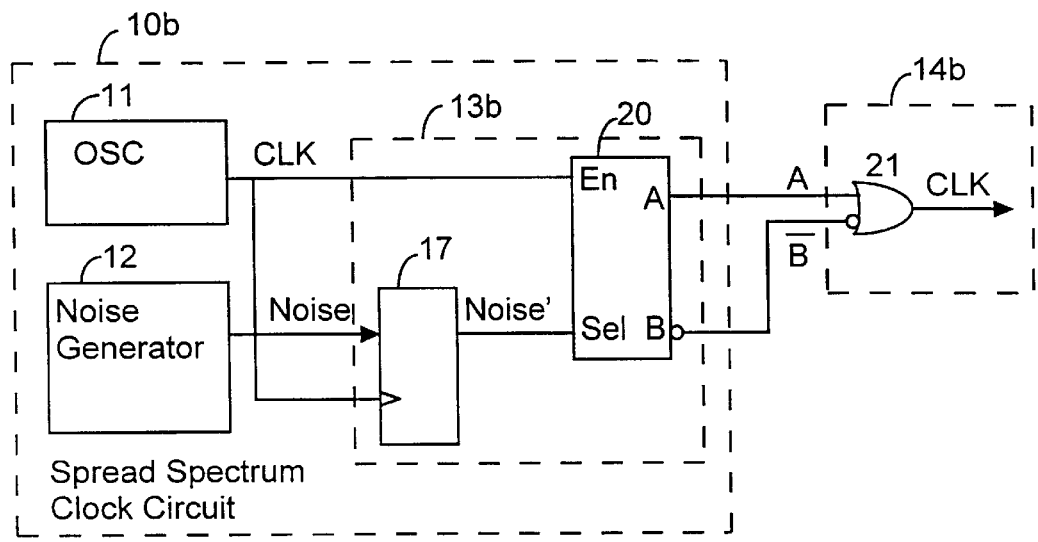
FIG. 14 is a block diagram of a spread spectrum clock circuit in accordance with a second embodiment of the circuit of FIG. 4.
Figure 15:
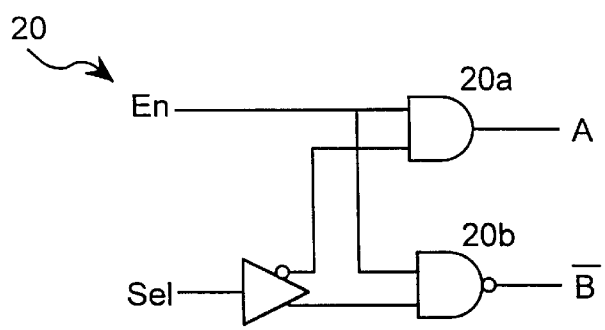
FIG. 15 is a schematic diagram of a logic circuit used in the embodiment of FIG. 14.

Referring now to FIG. 14, in a second embodiment of the present invention the spread spectrum clock circuit 10b combines the clock signal CLK and the sampled noise signal Noise' in a linear manner using a logic circuit 20. As mentioned above, it is sometimes desirable to combine the clock signal CLK and the noise signal Noise in a linear manner where it is unlikely that EMI radiation will accidentally combine in a sufficiently constructive manner to cause large EMI spectral energy spikes. In some embodiments, the logic circuit 20 is a data selector circuit or decoder circuit, an example of which is shown in FIG. 15. The logic circuit 20 receives the clock signal CLK at its enable terminal and, in response to the logic state of the time-delayed noise signal Noise' received at its select terminal, alternately couples the clock CLK to channels A and B. In this manner, transmission of the clock signal CLK from spread spectrum clock circuit 10b to components 2–4 of the computer 1 (FIG. 3) alternates between channels A and B in a random or pseudo-random fashion, as determined by the time delayed noise signal Noise'. Further, the B channel is inverted so that the EMI radiation from the A and B channels combines in a destructive manner (assuming that channels A and b are routed close together), and does not combine to produce an EMI spectral energy spike similar to the one described earlier. As shown in FIG. 15, AND and NAND gates 20a and 20b are used to buffer the CLK signal when it is asserted on channels A and B, respectively.

The receiving circuit 14b situated within each of the components 2–4 recovers the clock signal CLK from the signals on channels A and B. The receiving circuit 14a includes an OR gate 21 having first and second input terminals coupled to respective channels A and B, and an output terminal upon which the recovered clock CLK appears. The B channel input of the OR gate 21 is an inverting input. The embodiment of FIG. 14 generates a signal that is similar to a unipolar RZ signal on both channels A and B, so its composite spectrum is the combination of two spectra that are similar to a unipolar RZ spectra.

Figure 16:
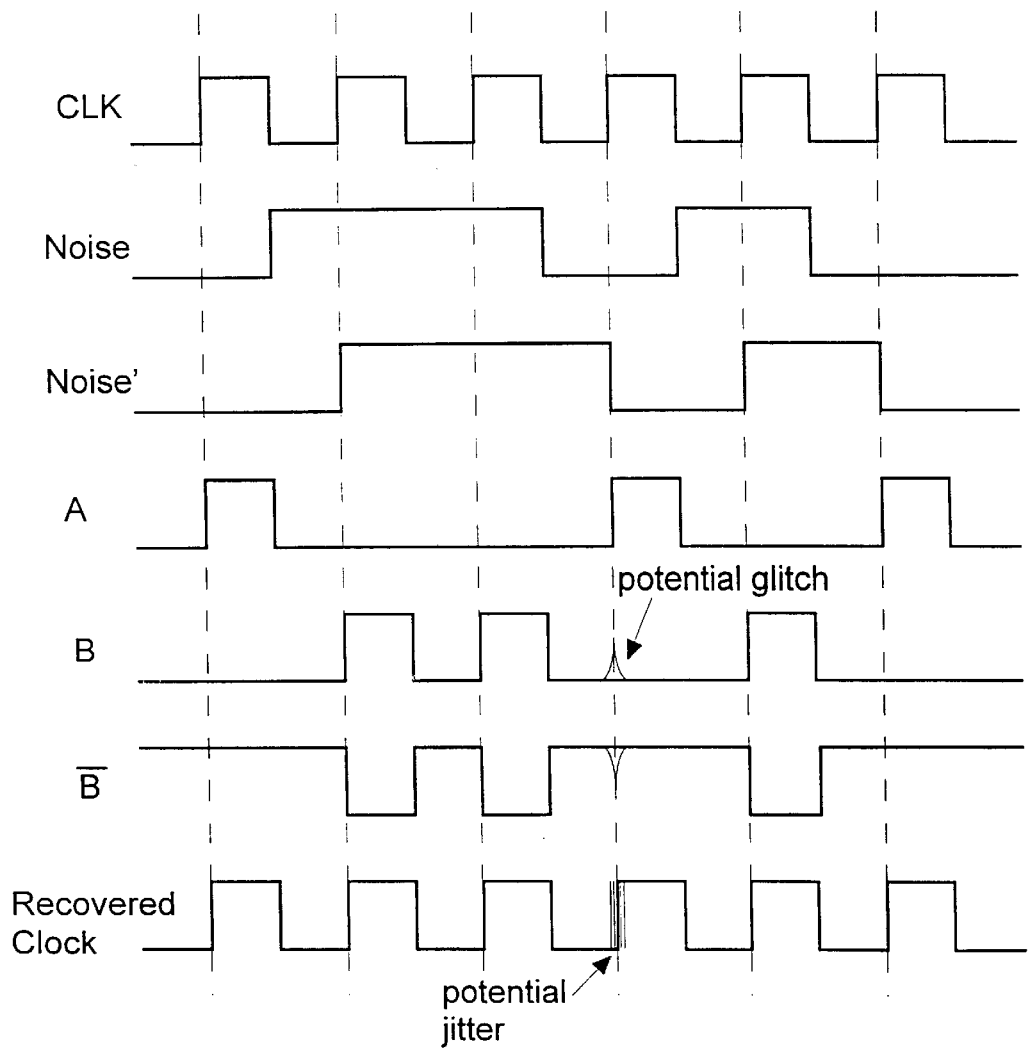
FIG. 16 is a timing diagram of signals used in the circuit shown in FIG. 14.

Referring also to the timing diagram of FIG. 16, a sampled non-periodic Noise signal generated by the noise generator 12 is clocked into the flip-flop 17 using the clock signal CLK. The resultant time-delayed signal Noise' is combined with the clock signal CLK in the logic circuit 20 as described previously. Thus, when the signal Noise' is at logic low, the clock CLK is forwarded to channel A while channel B is maintained logic high (and thus inactive). Conversely, when the signal Noise' is at logic high, the clock signal CLK is inverted and then forwarded to channel B while channel A is maintained logic low (and thus inactive). The original clock CLK is recovered by combining the signal waveform on channel A with the complement of that on channel B in the OR gate 21.

FIG. 16 shows that the spread spectrum clock signal on channel B may contain glitches, caused by transitions in the periodic clock signal reaching circuit 20 (see FIGS. 14 and 15) before corresponding changes in the Noise' signal. Similar glitches can occur on the channel A signal. These glitches, if they occur, may result in "jitter" (i.e., uncertainty in timing) in the rising edges of the recovered clock signal. The falling edges of the recovered clock signal will generally have little or no jitter.

Figure 17A:
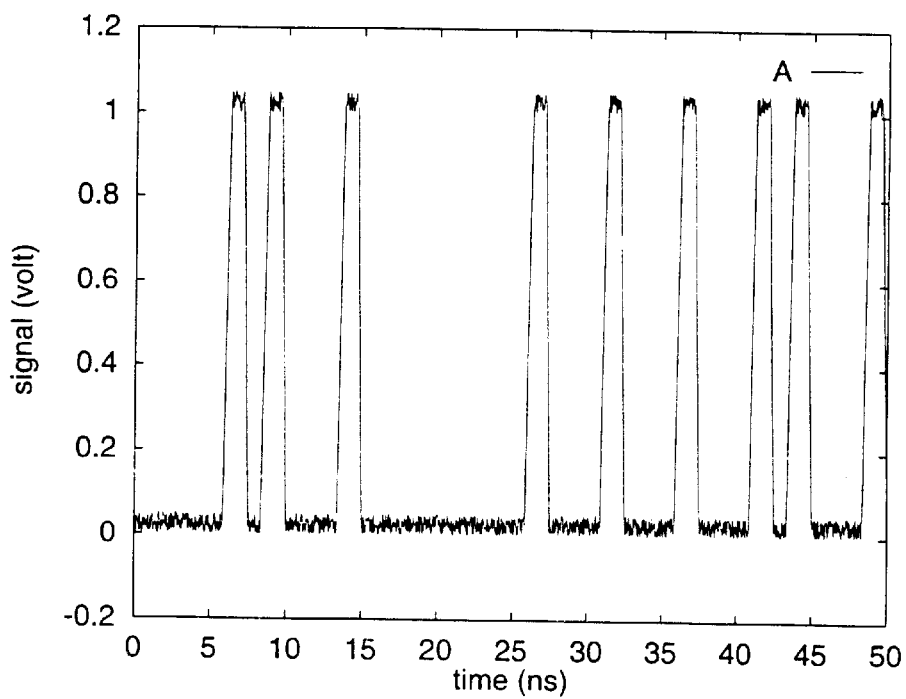
FIGS. 17A and 17B are time plots of the spread spectrum clock signal generated by the circuit shown in FIG. 14.
Figure 17B:
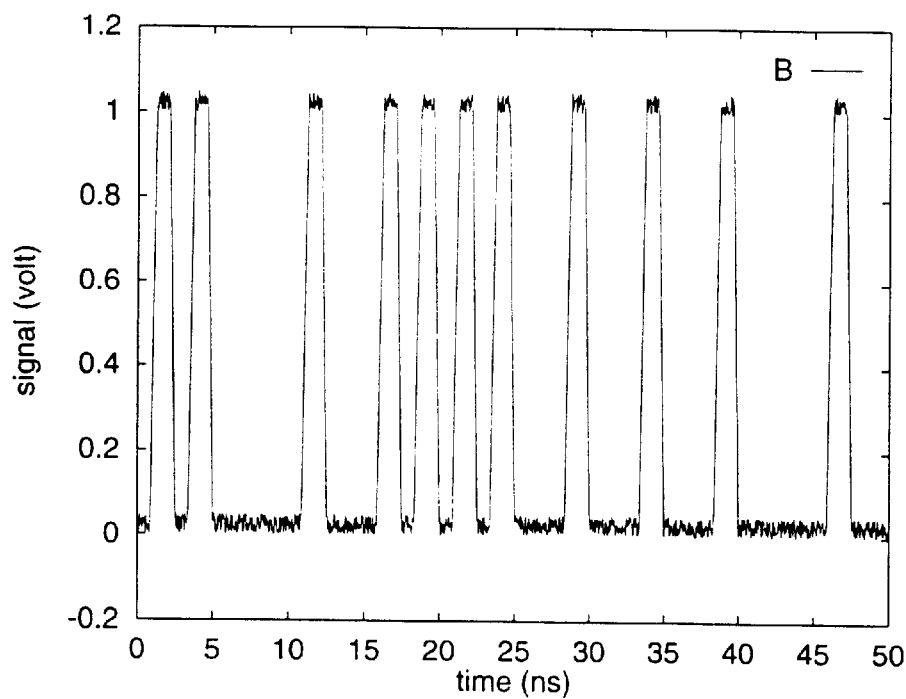
Figure 18A:
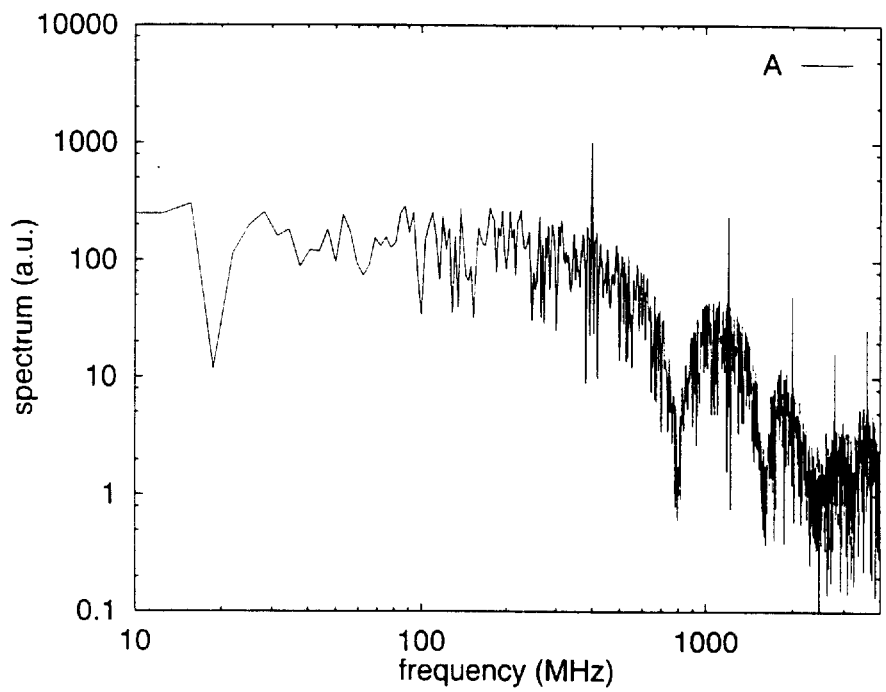
FIGS. 18A and 18B are graphs of energy versus frequency for the spread spectrum clock signals of FIGS. 17A and 17B, respectively.
Figure 18B:
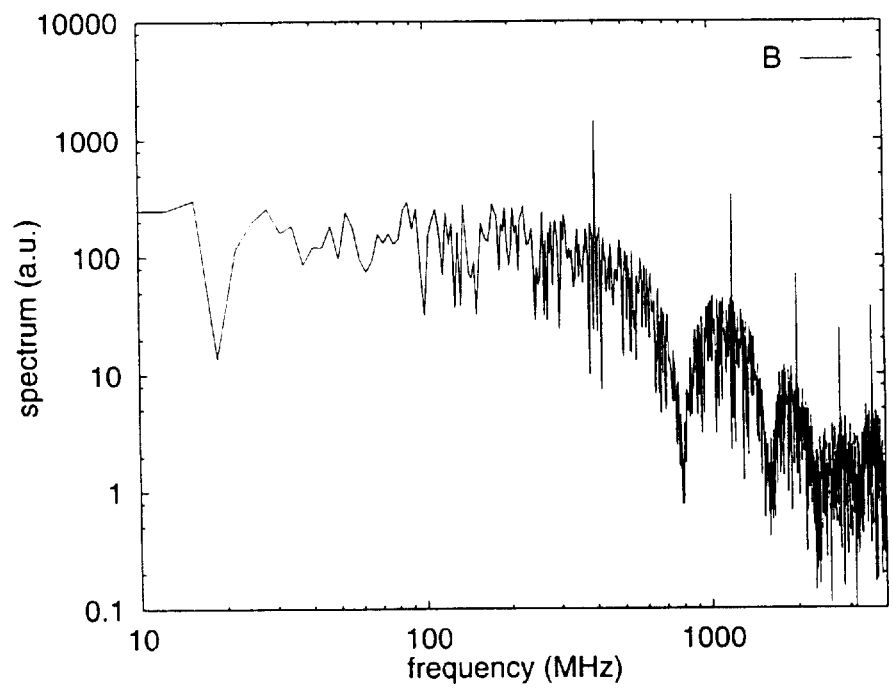

Transmitting a spread spectrum clock as described above with respect to the second embodiment shown in FIG. 14 spreads the EMI energy in a random or pseudo-random fashion over a wide frequency range in the manner discussed before. For instance, the resultant waveforms provided on channels A and B by the spread spectrum clock circuit 20 are of the type shown in FIGS. 17A and 17B, respectively. The energy radiated by these waveforms is spread over a wide frequency range in a non-periodic manner, as shown in FIGS. 18A and 18B, and the peak energy radiated is only several hundred a.u. In contrast, the energy spikes of the original, periodic clock CLK exceed 1000 a.u. (see FIGS. 8 and 9).

Analog Switch Based Embodiment

Figure 19:
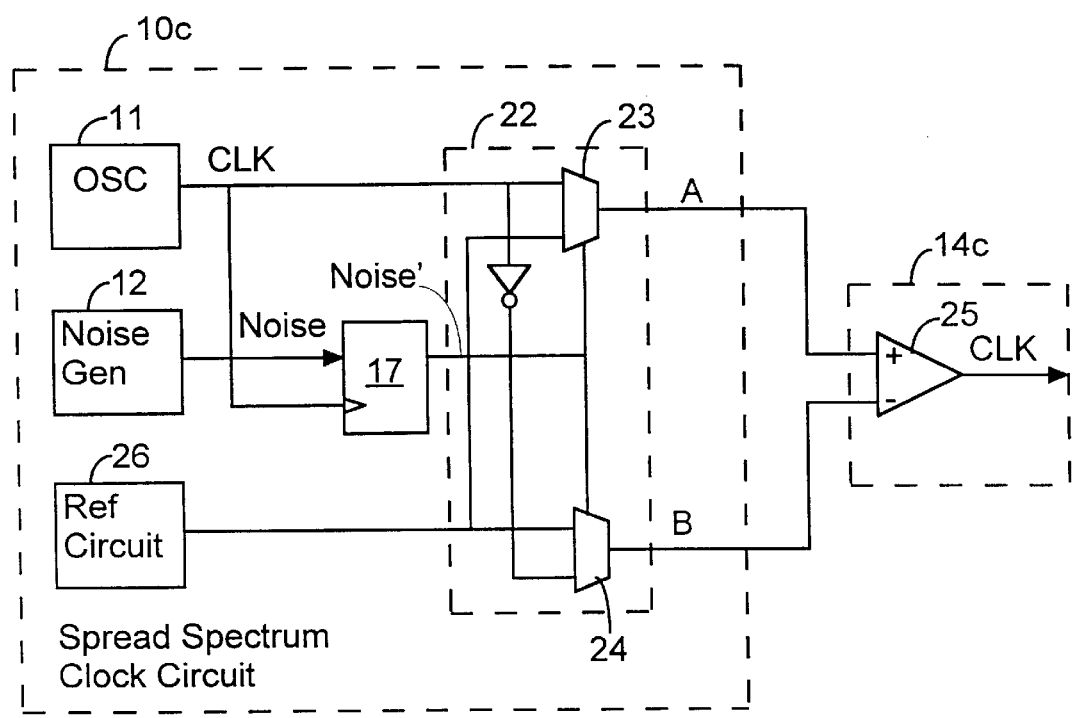
FIG. 19 is a block diagram of a spread spectrum clock circuit in accordance with a third embodiment of the present invention.

Referring now to FIG. 19, a spread spectrum clock circuit 10c in accordance with a third embodiment includes a reference voltage circuit 26 for generating a reference voltage $V_{ref}$. The clock signal CLK provided by the oscillator 11 and the reference voltage signal $V_{ref}$ are provided as input signals to a logic circuit 22. The noise signal Noise, produced by noise generator 12, is clocked into the flip-flop 17 to provide a time delayed noise signal Noise' which, in turn, is provided as a control signal to the logic circuit 22. Here, the signal Noise' controls the state of analog switches 23 and 24 which alternately couple the clock CLK to channels A and B in response to the logic state of the noise signal Noise' while maintaining the unselected channel at the reference voltage $V_{ref}$ (and thus inactive).

Figure 20:
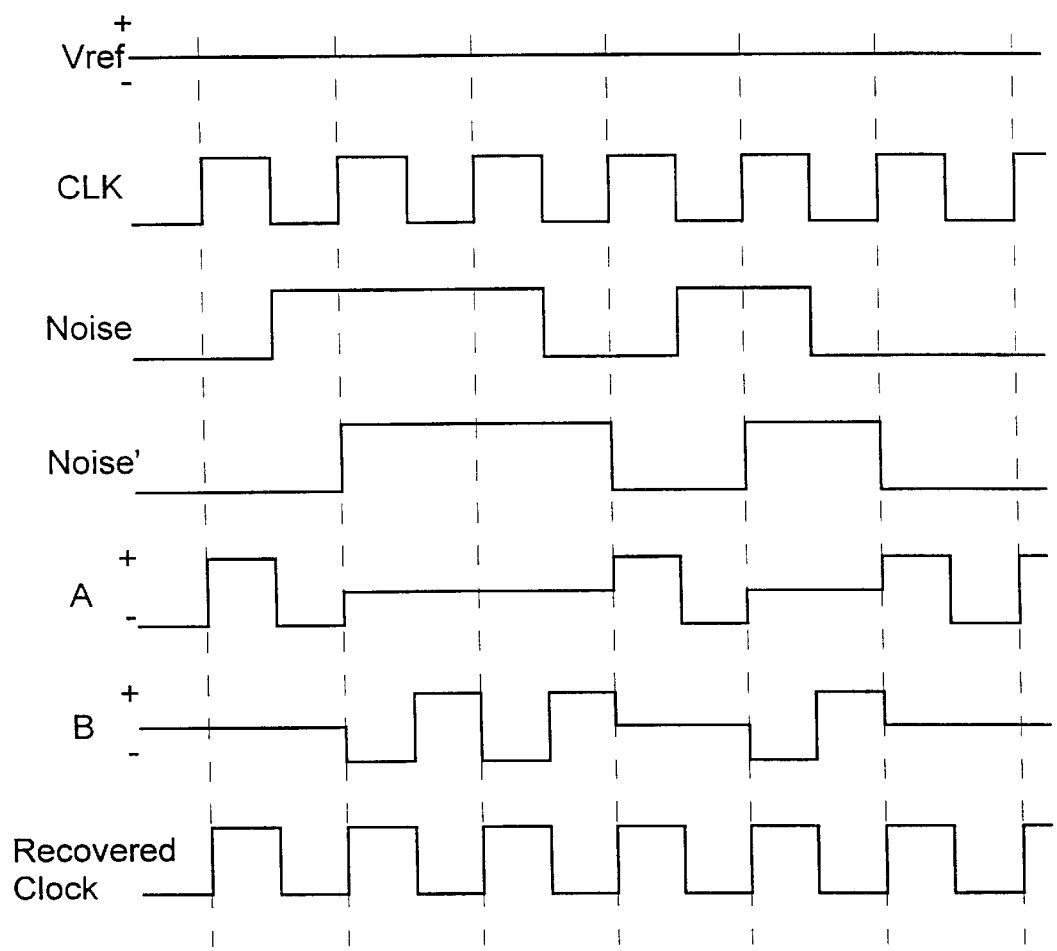
FIG. 20 is a timing diagram of signals used in the circuit shown in FIG. 19.

For instance, referring also to FIG. 20, when the signal Noise' is logic low, the logic circuit 22 transmits the clock signal CLK to the receiving circuit 14c channel A while maintaining channel B at the reference voltage $V_{ref}$ (and thus inactive). Let this relation be called the P relation for the channels. Conversely, when the signal Noise'is logic high, the logic circuit 22 transmits the clock signal CLK to the receiving circuit 14c via channel B while maintaining channel A at the reference voltage $V_{ref}$ (and thus inactive). Let this relation be called the N relation for the channels. The clock signal, when transmitted on channel B is inverted. In this manner, transmission of the clock signal CLK from spread spectrum clock circuit 10c to components 2–4 of the computer 1 alternates between channels A and B in a random or pseudo-random fashion, as determined by the time delayed noise signal Noise'. In this embodiment, the P relation lasts for at least for one CLK clock cycle and the N relation lasts for at least for one CLK clock cycle if the value of the noise signal were to change every clock cycle of the CLK signal. This embodiment produces a random sequence of P and N relations and relies on proper routing of channels A and B to suppress the clock noise (i.e., the A and B channels should be routed close to each other. Also, circuit 22 combines the clock signal CLK and the noise signal Noise in a linear manner, the advantages of which are discussed previously.

The receiving circuit 14c situated within each of the components 2–4 recovers the clock signal CLK from the information received from the spread spectrum clock circuit 10c via channels A and B. The receiving circuit 14c includes a comparator circuit 25 having an input terminal coupled to receive the respective signals on channels A and B, and an output terminal upon which the clock signal CLK appears. When a P relation is received at the comparator, the clock signal is recovered because the comparator acts as a non-inverting buffer for the CLK signal. When the N relation is transmitted to the receiver, the CLK signal is recovered because the comparator acts as an inverting buffer for the CLK signal.

Figure 21:
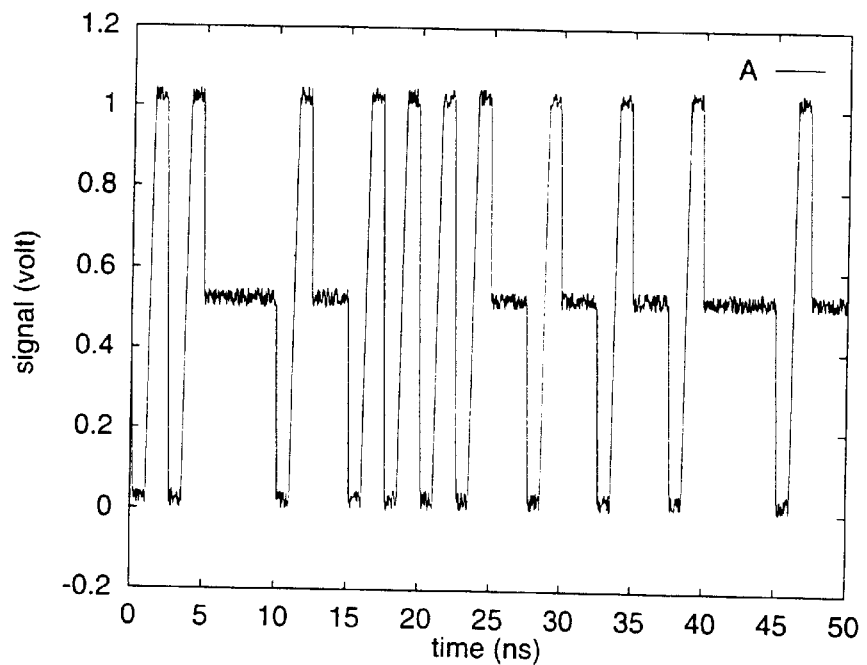
FIG. 21 is a time plot of a spread spectrum clock signal transmitted on channel A of the circuit shown in FIG. 19.
Figure 22:
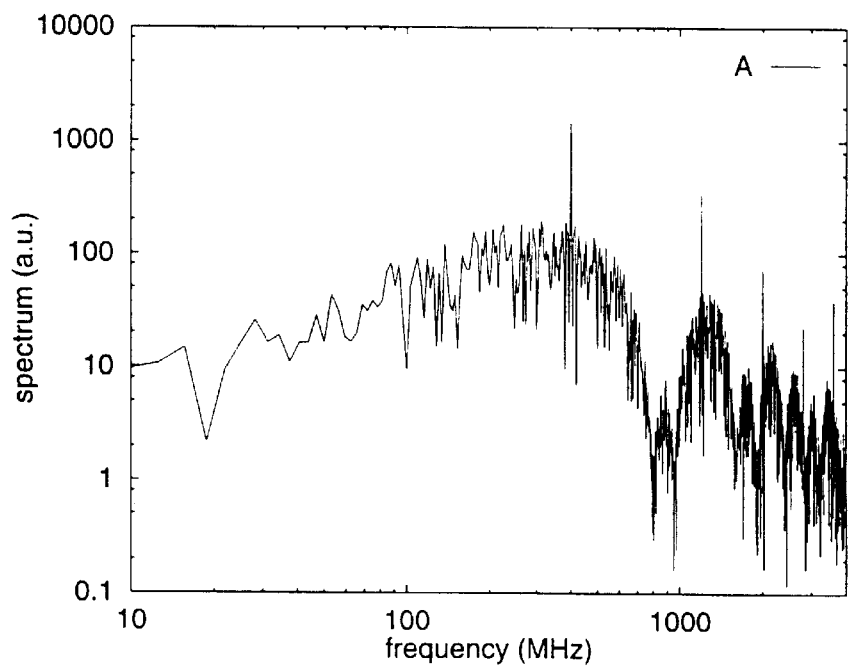
FIG. 22 is a graph of energy versus frequency for the spread spectrum clock signal of FIG. 21.
Figure 23:
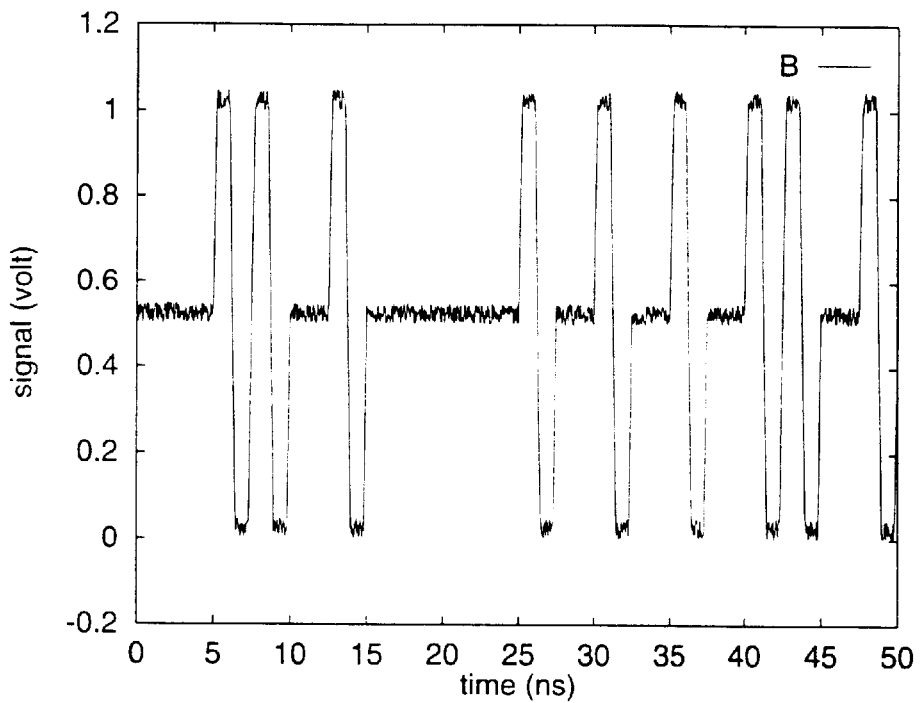
FIG. 23 is a time plot of a spread spectrum clock signal transmitted on channel B of the circuit shown in FIG. 19.
Figure 24:
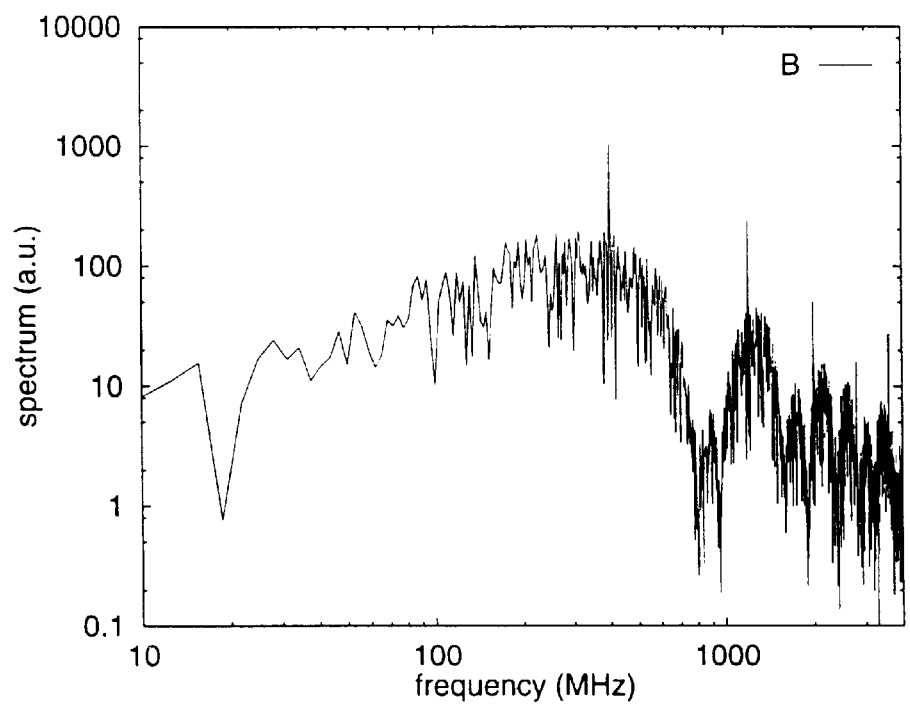
FIG. 24 is a graph of energy versus frequency for the spread spectrum clock signal of FIG. 23.

Transmitting a spread spectrum clock as described above with respect to the embodiment of FIG. 19 spreads the EMI energy in a non-periodic manner over a wide frequency range. The spreading of energy over a wide spectrum is accomplished by the random order of the P and N relations on the channel and by proper layout of the channels so that the channels are in close proximity to one another. FIG. 21 shows the random data on channel A for the embodiment of FIG. 19. In FIG. 22 the energy spikes are evident at the clock rate and at harmonics of the clock rate. This spectrum is similar to a unipolar RZ power spectral density. Channel B data for the circuit of FIG. 19 is shown in FIG. 23 and a corresponding graph of energy versus frequency for the channel B signal is shown in FIG. 24.

While both the channel A and B signals, if transmitted alone, would have somewhat lower spectral energy spikes than the periodic clock signal shown in FIG. 8, when the two channels are routed next to each other the resulting radiated signals have much lower spectral energy peaks because the radiation from the two channels signals partially cancel each other out, since channel B is inverted while channel A is not. As a result, the spectral energy of the two channels combined is spread over a wide frequency range in a non-periodic manner, and the peak energy radiated is only several hundred a.u., in contrast with the energy spikes of the original, periodic clock CLK, which exceed 1000 a.u.

Embodiments Using Two Independent Random Number Generators

Figure 25:
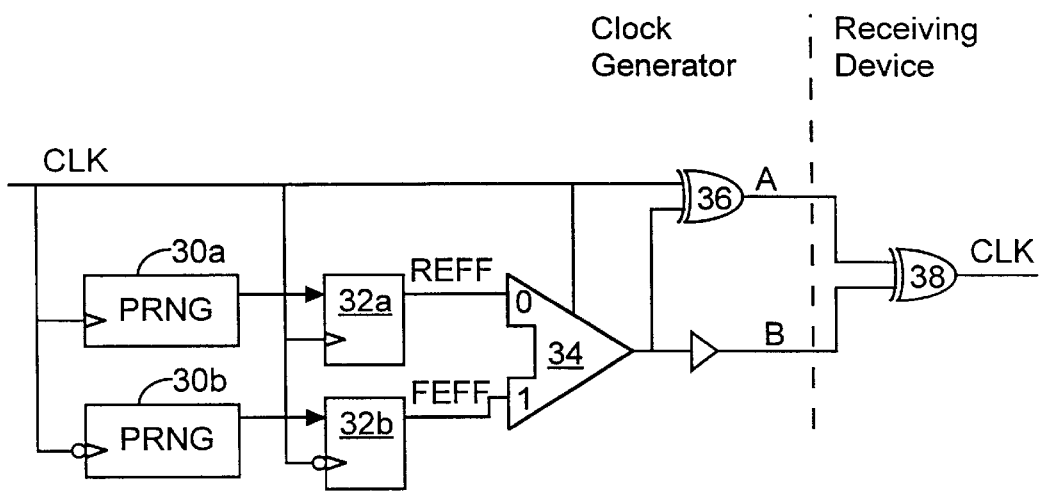
FIG. 25 is a block diagram of a spread spectrum clock circuit in accordance with a fourth embodiment of the present invention.

FIG. 25 shows an alternate embodiment of the present invention. In FIG. 25 there are two random number generators 30a, 30b, which are coupled, respectively to two flip-flops 32a, 32b. One flip-flop 32a is clocked on the rising edge of the CLK signal and the other flip-flop 32b is clocked on the falling edge of CLK. Coupled to the outputs of the flip-flops 32a, 32b is a multiplexor 34 that, depending on the state of the CLK signal, selects either a signal REFF, which is the output of flip-flop 32a, or a signal FEFF, which is the output of flip-flop 32b. The CLK signal and the output of the multiplexor 34 are then coupled to an exclusive OR (XOR) gate 36 to create the clock signal that is to be transmitted on one channel (channel A), while the signal transmitted on the second channel (channel B) is simply the buffered output of the multiplexor 34. The two random number generators 30a, 30b are preferably independent of each other, meaning that they are neither commonly synchronized nor commonly seeded.

In operation, when the rising edge of CLK occurs, the multiplexor 34 selects FEFF for output on channel B, and because CLK is high, the signal on channel A is an inverted version of the signal on channel B, due to the logic function of the XOR gate 36. Thus, when CLK is high, channels A and B are in opposite states (herein called an O relation, for opposite channel states), although the particular state of the signals on channels A and B is determined by a substantially random process.

When the falling edge of CLK occurs, REFF is selected for output on channel B and because CLK is low, channel A has the same state as channel B. Thus, when CLK is low, channels A and B are in the same state (the signals on the two channels have an identity or "I" relation), though the particular state of the channel signals is determined by a substantially random process. This pattern or relations (alternating between opposite "O" and identity "I" relations) repeats as the CLK signal cycles back and forth between high and low states. The result is that the circuit creates a pattern of relations between the signals on channels A and B, though the state of each channel is substantially random, depending completely on the states of the random number generators 30a, 30b. Also, because REFF is not selected by the multiplexor 34 immediately after it's flip-flop has been clocked, and similarly FEFF is not selected immediately after it's flip-flop has been clocked, the multiplexor 34 presents stable signals to the channels A and B. This embodiment has the advantage of having a greater amount of randomness on the channels that are coupled to the receiver circuitry (i.e., in receiver devices) owing to the use of the two random number generators to generate a different random signal state on each channel for each half clock cycle, rather than each full clock cycle. At the receiver(s), all that is needed to recover the clock is an XOR gate 38. When the signals on channels A and B are in the same state, the recovered clock is low and when the signals on channels A and B are in opposite states the recovered clock is high. Thus the original clock is properly reconstructed from the relationship between the channel A and B signals, despite the substantially random state of the signals on the channels A and B.

Figure 26A:
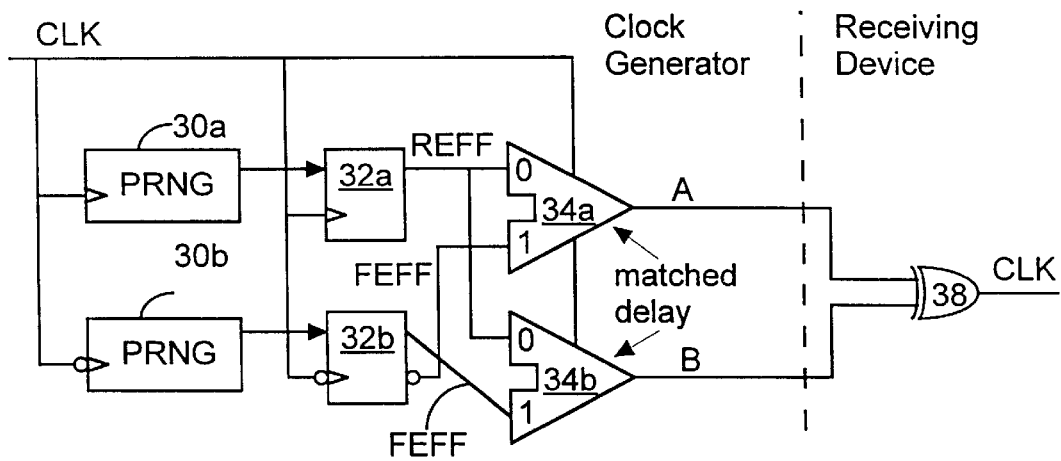
FIG. 26a is a block diagram of a spread spectrum clock circuit in accordance with a fifth embodiment of the present invention.

FIG. 26a shows another alternate embodiment of the present invention, but which is superior to the one shown in FIG. 25 because the use of matched delay multiplexors 34a, 34b reduces jitter in the recovered clock signal. In FIG. 26a there are once again two random number generators 30a, 30b, which are coupled, respectively to two flip-flops 32a, 32b. As in FIG. 25, one flip-flop 32a is clocked on the rising edge of the CLK signal and the other flip-flop 32b is clocked on the falling edge of CLK.

Figure 26B:
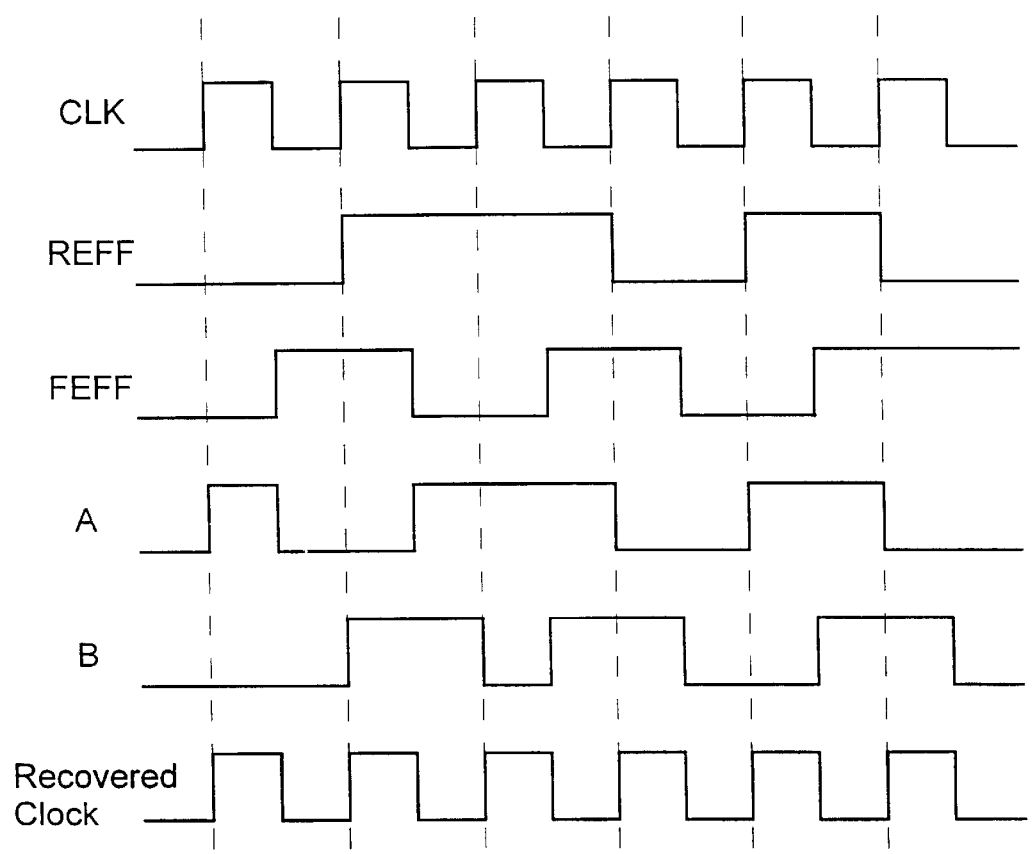

In this embodiment outputs (REFF, FEFF) of the flip-flops 32a, 32b are coupled to a pair of multiplexors 34a, 34b that have matching delays. The outputs of the multiplexors 34a, 34b are coupled respectively to the channels A and B for transmission to the receiving devices. The operation of the circuit in FIG. 26a is similar to the operation of the circuit in FIG. 25. Referring to the timing diagram shown in FIG. 26b as well as the circuit diagram in FIG. 26a, when CLK is high, the FEFF signal is selected for output on channel B while the complement of FEFF is selected for output on channel A. When CLK is low, the signals on both channels are in the same state (REFF), though the state is substantially random. An advantage of this embodiment is that the skew between the signals on channel A and B is smaller than in the circuit shown in FIG. 25 because the delays from the rising and falling edges of CLK through the circuit are matched, there being a multiplexor of like delay coupled to both channels. Again, to recover the clock signal, only an XOR gate 38 is required at the receiver to sense whether the signals on the channels are in the same or opposite state. When the signals on the channels are in the opposite state the reconstructed clock is high; when the signals on the channels are in the same state the reconstructed clock is low. By inverting the output of the XOR gate 38, a recovered clock having the opposite relationship to the channel signals can be produced.

In each of the embodiments of FIGS. 25 and 26a, a high quality (e.g., completely random) random noise source may be employed to take the place of both random number generators 30a, 30b, with each flip-flop 32a, 32b being coupled to the one random noise source.

Figure 27:
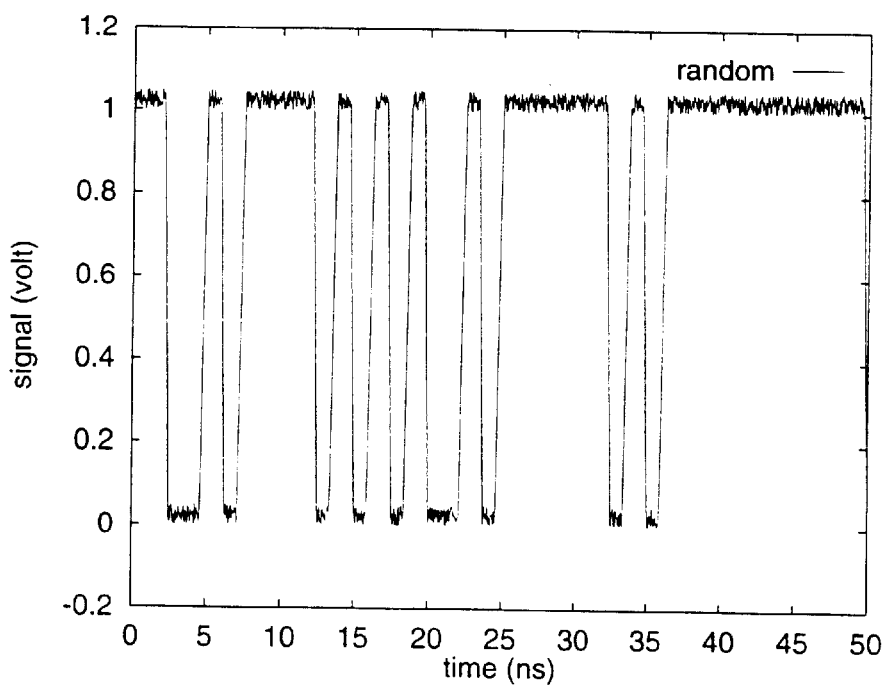
Figure 28:
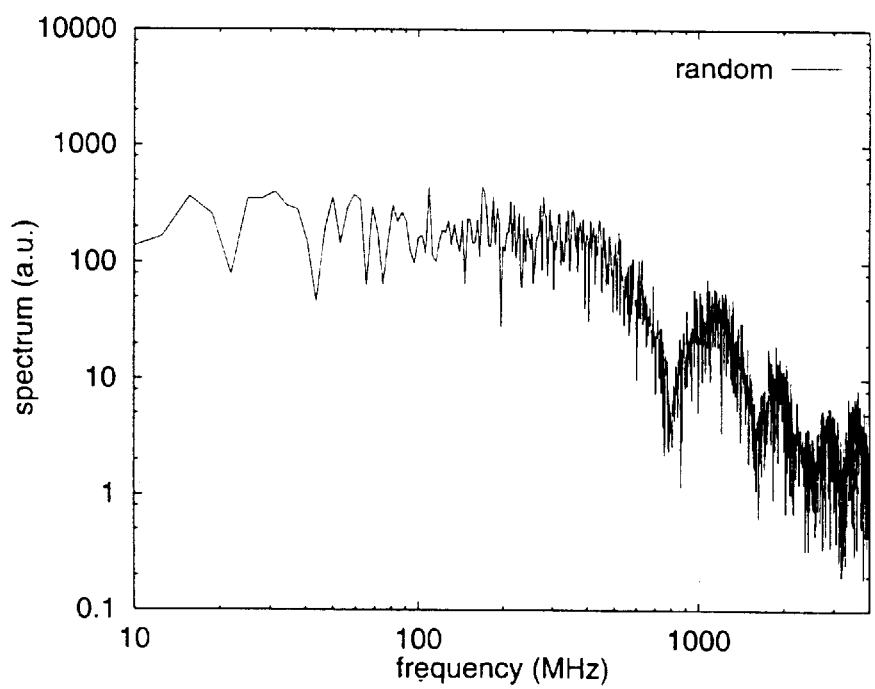
FIG. 28 is a graph of energy versus frequency for the random noise signal of FIG. 27.

FIG. 27 shows a time plot of the random data generated by the pseudo-random number generators 30a, 30b for the embodiment in FIGS. 25 and 26a. The data bit rate is 800 MHZ and the spectrum for each channel resembles that of an NRZ power spectral density with the frequency shifted to 800 MHZ. The energy radiated by this waveform is shown in FIG. 28. The peak energy is higher at frequencies below 400 MHZ, but drops significantly at 800 MHZ and above.

Figure 29:
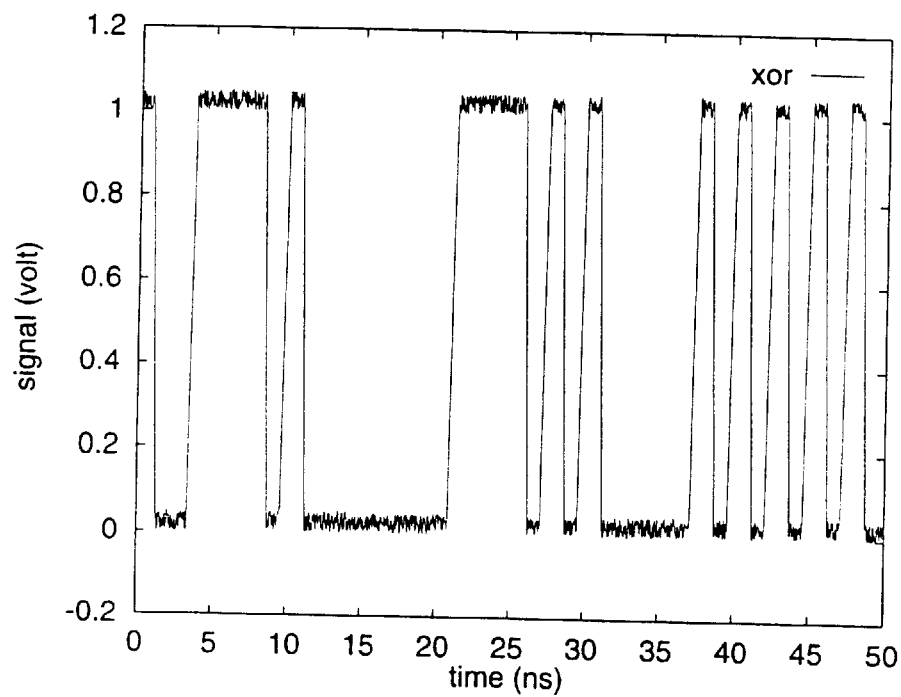
FIG. 29 is a graph illustrating a spread spectrum clock signal generated by the circuits shown in FIGS. 25 and 26a and transmitted and transmitted on channel A of those circuits.
Figure 30:
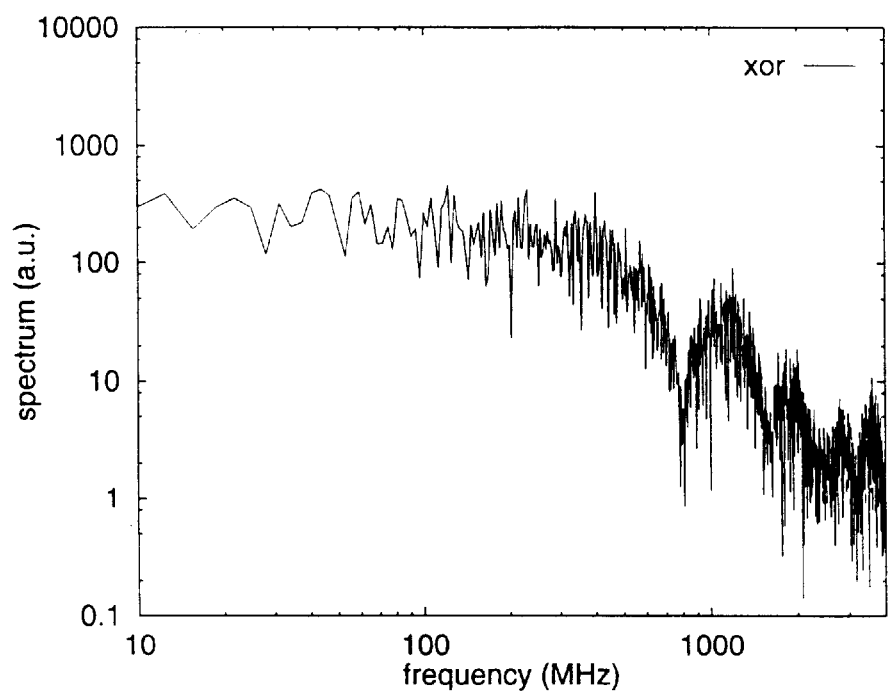
FIG. 30 is a graph of energy versus frequency for the spread spectrum clock signal of FIG. 29.

FIGS. 28 and 29 show a time plot of the composite spread spectrum clock signal output on channel A of the circuit shown in FIG. 25, and a plot of energy versus frequency for the spread spectrum clock signal, respectively.

Embodiments Using Synchronized Noise Sources

Figure 31:
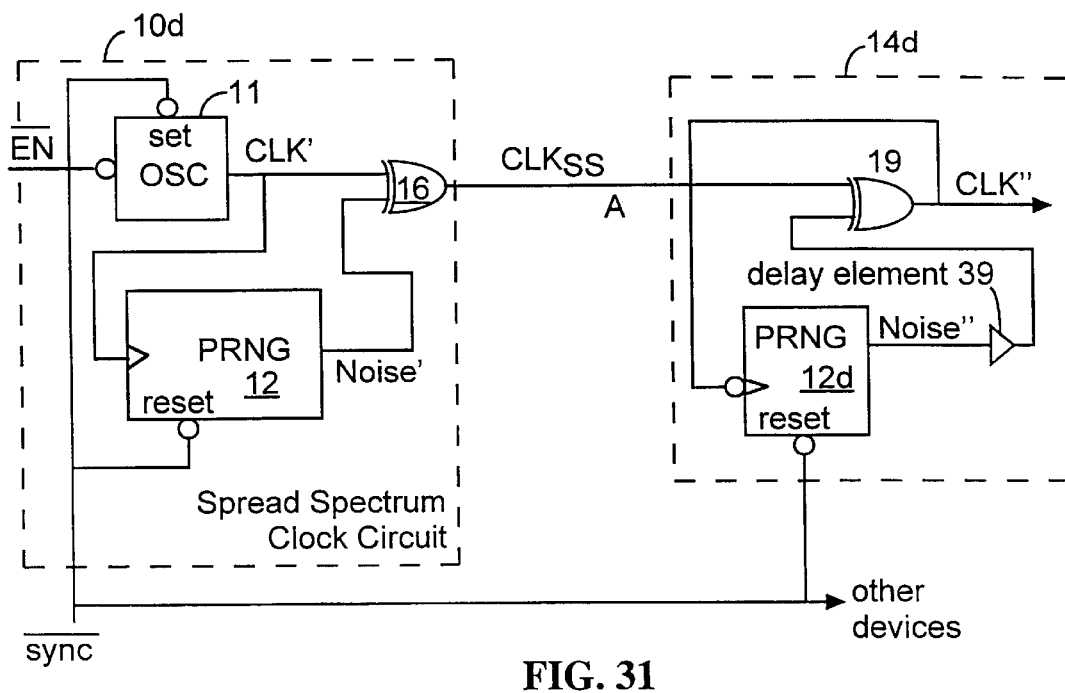
FIG. 31 is a schematic diagram of a spread spectrum clock circuit in accordance with an embodiment of the circuit of FIG. 5.

The embodiments discussed above and shown, for instance, in FIGS. 6, 14, 19, 25, and 26a, are based upon the topology depicted in FIG. 4. Referring now to FIG. 31, an embodiment based upon the topology of FIG. 5 is shown to have a spread spectrum clock generation circuit (also called the transmitting circuit) 10d in the transmitting device and a clock recovery circuit 14d in the receiving devices. The clock generator circuit 10d includes the oscillator 11, the noise generator 12, and the XOR logic gate 16. The oscillator 11 provides the clock signal CLK to an input terminal of the XOR gate 16 and to the clock input (triggering on the upward transition of the CLK signal) of the noise generator 12. The noise generator 12 provides the non-periodic bit Noise' signal to another input terminal of the XOR gate 16, and the XOR gate 16 has an output terminal coupled to the communication channel A.

Figure 32:
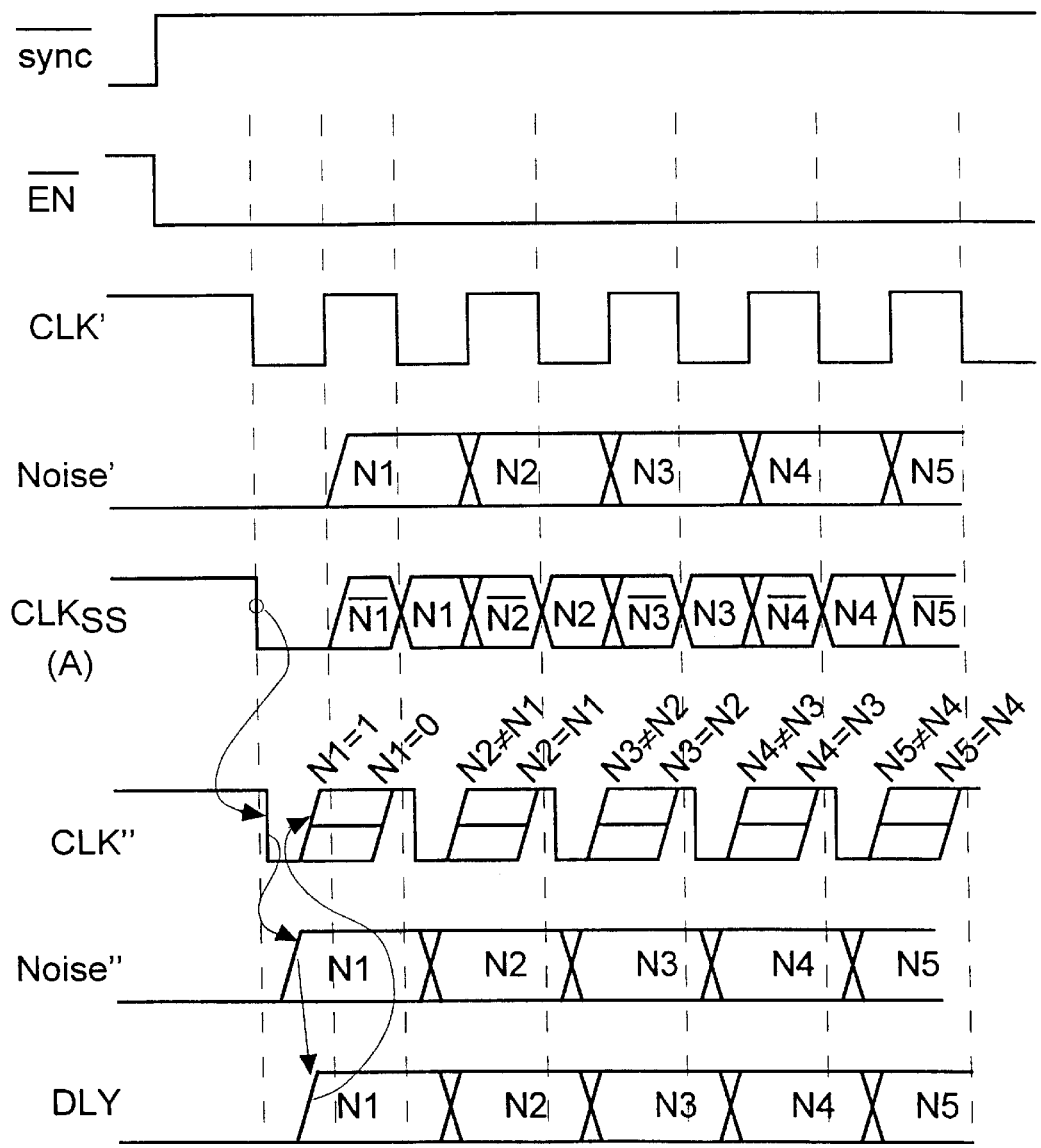
FIG. 32 is a timing diagram of signals used in the circuit shown in FIG. 31.

The clock recovery circuit 14d includes the XOR logic gate 19, another instance 12d of the noise generator (but negative edge triggered in this case) connected together as shown in FIG. 31. The noise generator 12d is clocked on negative (i.e., down) transitions of the recovered clock signal CLK". The output from the noise generator 12d is labeled Noise". Referring to FIG. 32, the Noise" signal in the clock recovery circuit 14d may run ahead of the Noise' signal generated in the spread spectrum clock circuit 10d by as much as half of a clock cycle, because the noise generator 12d is triggered on negative clock edges. A delay element 39 is used to control the duration of down pulses in the recovered clock signal CLK".

A synchronization signal $\overline{\text{SYNC}}$ is provided to the reset terminals of the noise generator 12, 12d in both the clock generator circuit 10d and the clock recovery circuit 14d, and also to the set terminal of the oscillator 11 in the clock generator circuit. The noise generators 12, 12d respond to receipt of a synchronization signal (e.g., a pulse) by resetting to a predefined start state, and the oscillator 11 responds by setting to predefined state. As a result, each noise generator 12, 12d generates identical noise (Noise' and Noise") signals so long as both noise generators 12, 12d are clocked at the same rate. In this manner, the noise signal Noise' provided to the XOR logic gate 16 within the clock generator circuit 10d is the same as the Noise" provided to the XOR logic gate 19 within the clock recovery circuit 14d. An enable signal EN is provided to enable the oscillator 11.

Referring to the timing diagram of FIG. 32, the non-periodic Noise' signal generated by the noise generator 12 of the circuit 10d is combined with the clock signal CLK in the XOR gate 16 to generate a spread spectrum clock signal $CLK_{ss}$. The spread spectrum clock signal $CLK_{ss}$ is transmitted to the clock recovery circuit 14d in each of the receiving devices 24 via a single channel A. The spread spectrum clock signal $CLK_{ss}$ received from channel A is combined in the XOR gate 19 with the time delayed noise signal Noise" provided by delay element 39 of the clock recovery circuit 14d. In this manner, the output terminal of the XOR gate 19 provides a recovered clock signal CLK". The recovered clock signal CLK" has down transitions that accurately track those of the original clock signal CLK, but the timing of the up transitions of the recovered clock signal CLK" vary depending on the value of the Noise" signal for each clock cycle as compared with the value of the Noise" signal for the previous clock cycle. More specifically, at each clock cycle of CLK", the down pulse in CLK" is short (i.e., it transitions upward at the earlier of the two edges shown in FIG. 32) if the new Noise" value generated by the noise generator (upon receiving the down transition in CLK") is different from the previous value of Noise" for the last cycle of the CLK" signal. If the value of Noise" is the same for current and previous clock cycles, the down pulse for the current clock cycle is long (i.e., it transitions upward at the later of the two edges shown in FIG. 32).

It is noted that the down transition edges of the recovered clock signal CLK" are generated by transitions in the $CLK_{ss}$ signal, in conjunction with the current value of Noise". The upward transitions in the CLK" signal are generated either by (A) a corresponding transition of the $CLK_{ss}$ signal while the Noise" signal remains unchanged from the previous clock cycle, or (B) a change in the Noise" signal while the $CLK_{ss}$ signal remains unchanged. Thus, it is the combination of information in the $CLK_{ss}$ signal and information in the Noise" signal that enables creation of all the up and down edges of the recovered clock signal CLK".

The receiving devices 2–4 will typically use a local DLL to generate a local clock that is synchronized with the down transitions of the recovered clock signal CLK".

One advantage of the circuit shown in FIG. 31 is that only one high speed bus is needed to transmit a spread spectrum clock signal from the clock generator to the receiving devices, whereas the other embodiments require two high speed busses for this purpose. Of course, the spread spectrum clock generated by the circuit shown in FIG. 31 could be transmitted over two parallel busses, as a differential signal, by generating and transmitting both $CLK_{ss}$ and its inverse.

Transmitting a spread spectrum clock signal as described above with respect to FIGS. 5 and 31 results in a significant reduction in the peak EMI energy at harmonics of the clock frequency $f_{CLK}$. As described above with reference to FIGS. 8 and 9, a periodic clock waveform CLK having a frequency $f_{CLK}$ has significant energy spikes at the fundamental frequency $f_{CLK}$ and at the odd harmonics thereof. As shown in FIG. 9, the peak energy at the clock frequency $f_{CLK}$ exceeds 1000 a.u.

The distribution of signal energy over frequency for the spread spectrum clock signal $CLK_{ss}$, is the same as that shown in FIG. 11. The clock EMI energy for the $CLK_{ss}$ signal is spread in a random manner over a wide frequency band. As a result, the maximum energy radiating from the spread spectrum clock signal $CLK_{ss}$ is only a few hundred a.u. This represents a nearly ten-fold reduction in peak energy, as compared with that of the original, periodic clock CLK. As a result, present embodiments more easily allow for the fabrication of high-speed, low-jitter systems, as compared to the prior art.

The choice of a particular circuit for suppressing the power at the clock frequency and its harmonics is a function of the type of structures in the proximity of the circuit and the resonant frequency characteristics of those structures.

Application of Spread Spectrum Technique to Data Signals

Figure 33:
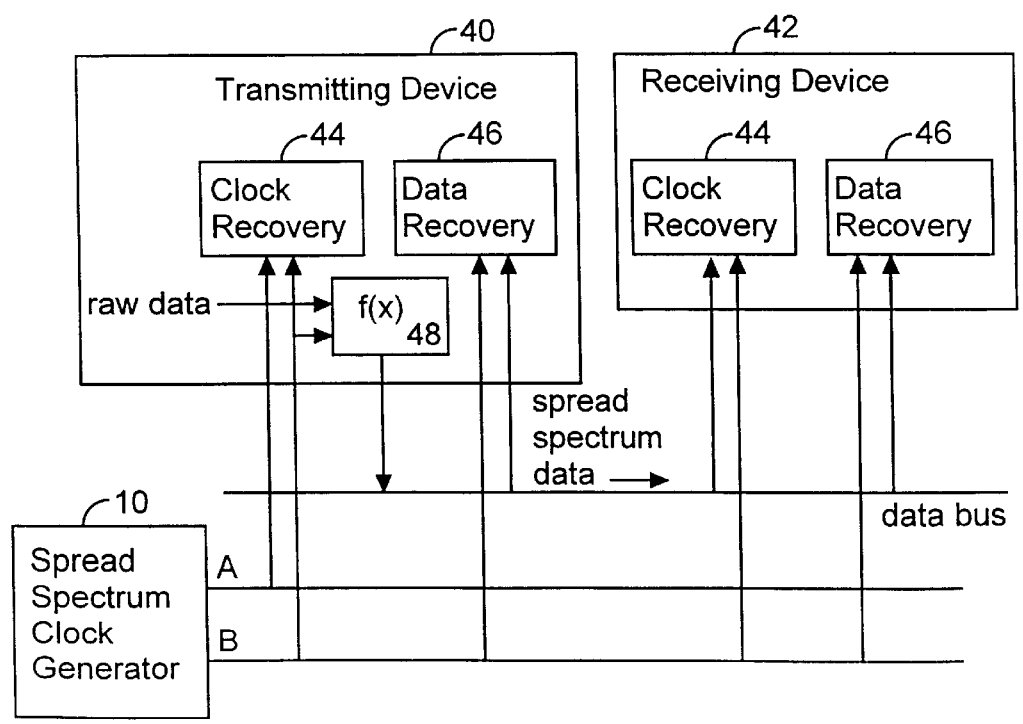
FIG. 33 is a schematic diagram of a spread spectrum clock generation circuit and a spread spectrum data generation circuit.

This document has focused on reducing EMI caused by the system clock, not data. Data is usually fairly random and thus the benefit of using spread spectrum technique for transmitting data signals over data busses is less clear. However, once the infrastructure investment has been made to generate a spread spectrum clock signal, the same pseudo random signal used to encode and decode the clock signal can also be used to encode and decode a data signal at very little additional cost. As shown in FIG. 33, a data transmitting device 40 may include a spread spectrum data generation circuit 48 and the receiving devices 42 may include a corresponding data recovery circuit 46. The same noise signal generated by the noise generator for use in the spread spectrum clock generation circuit 10 can be combined with one or more data signals by additional instances of a logic circuit that applies the f(x) function to the data signal and noise signal to generate a spread spectrum data signal. Each of the data handling devices 40, 42 includes a data recovery circuit 46 that receives the channel B signal as well as the spread spectrum data signal and applies a data recovery function to those two signals so as to recover the original data signal. The data recovery circuit 46 will typically be the same as the clock recovery circuit 44 used in each device, except that the clock recovery circuit 44 receives both clock bus signals while the data recovery circuit 46 receives one clock bus signal and a spread spectrum data signal from a data bus.

Alternate Embodiments

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. Apparatus for reducing electromagnetic interference of a system requiring a clock signal, the circuit comprising:
    a clock circuit configured to generate the clock signal;
    a noise generator configured to generate a noise signal;
    a logic circuit that combines the clock signal and the noise signal according to a function to generate a spread spectrum clock signal, the spread spectrum clock signal comprising a substantially random waveform, wherein the logic circuit includes a first output terminal and a second output terminal;
    one or more clock distribution buses configured to distribute the spread spectrum clock signal to one or more locations associated with the system, the one or more clock distribution buses comprising first and second channels establishing a communications link between the logic circuit and the one or more locations, the first channel and second channel coupled to the first output terminal and second output terminal, respectively, of the logic circuit; and
    a clock recovery circuit configured to recover the clock signal from the spread spectrum clock signal at the one or more locations,
    wherein the logic circuit comprises
        a data selector circuit having an enable terminal coupled to receive the clock signal, a select terminal coupled to receive the noise signal, and output terminals comprising said first and second output terminals coupled to the first and second channels, respectively.

2. The apparatus of claim 1, wherein the clock recovery circuit comprises a OR logic gate having first and second input terminals coupled to the first and second channels, respectively, and an output terminal upon which appears the recovered clock signal.

3. The apparatus of claim 1, wherein the data selector circuit alternately couples the clock signal to the first and second channels in response to the noise signal.

4. The apparatus of claim 3, wherein the first and second channels comprise first and second wires, respectively.

5. The apparatus of claim 3, wherein the clock recovery circuit comprises an OR logic gate having first and second input terminals coupled to the first and second channels, respectively, and an output terminal upon which appears the recovered clock signal.

6. The apparatus of claim 5, wherein the second output terminal of the data selector circuit and the second input terminal of the OR logic gate of the clock recovery circuit comprise logic inverting terminals.

7. The apparatus of claim 1, wherein the logic circuit further comprises a flip-flop having an input terminal coupled to receive the noise signal and having an output terminal coupled to the select terminal of data selector circuit, the flip-flop clocked with the clock signal.

8. The apparatus of claim 7, wherein the flip-flop comprises a data-type flip-flop.

9. The apparatus of claim 1, wherein the noise signal is a random bit pattern.

10. The apparatus of claim 1, wherein the noise signal is a pseudo-random bit pattern.

11. The apparatus of claim 1, wherein the function is linear.

12. The apparatus of claim 1, wherein the first and second channels comprise first and second wires, respectively.

13. The apparatus of claim 1, wherein the clock circuit includes an oscillator.

14. Apparatus for reducing electromagnetic interference of a system requiring a clock signal, the circuit comprising:
    a clock circuit configured to generate the clock signal;
    a noise generator configured to generate a noise signal;
    a logic circuit that combines the clock signal and the noise signal according to a function to generate a spread spectrum clock signal, the spread spectrum clock signal comprising a substantially random waveform, wherein the logic circuit includes a first output terminal and a second output terminal;
    one or more clock distribution buses for distributing the spread spectrum clock signal to one or more locations associated with the system, the one or more clock distribution buses comprising first and second channels establishing a communications link between the logic circuit and the one or more locations, the first channel and second channel coupled to the first output terminal and the second output terminal, respectively, of the logic circuit;
    a clock recovery circuit for recovering the clock signal from the spread spectrum clock signal at the one or more locations; and
    a reference circuit for generating a reference voltage,
    wherein the logic circuit comprises:
        a first switch having first and second input terminals coupled to receive the clock signal and the reference voltage, respectively, and an output terminal coupled to the first channel, the first switch alternately coupling the first channel between the clock signal and the reference voltage in response to the noise signal; and a second switch having first and second input terminals coupled to receive the clock signal and the reference voltage, respectively, and an output terminal coupled to the second channel, the second switch alternately coupling the second channel between the clock signal and the reference voltage in response to the noise signal.

15. The apparatus of claim 14, wherein the switches comprise multiplexers.

16. The apparatus of claim 14, wherein the clock recovery circuit comprises a comparator circuit having first and second input terminals coupled to the first and second channels, respectively, and an output terminal upon which appears the recovered clock signal.

17. The apparatus of claim 14, wherein the noise signal is a random bit pattern.

18. The apparatus of claim 14, wherein the noise signal is a pseudo-random bit pattern.

19. The apparatus of claim 14, wherein the function is linear.

20. The apparatus of claim 14, wherein the first and second channels comprise first and second wires, respectively.

21. The apparatus of claim 14, wherein the clock circuit includes an oscillator.

22. A method for reducing the electromagnetic interference (EMI) of a clock signal to be distributed via one or more buses to a receiving component of an electronic device, the method comprising:

generating a noise signal;

combining the clock signal with the noise signal to generate a spread spectrum clock signal;

distributing the spread spectrum clock signal to the receiving component via the one or more buses; and recovering the clock signal from the spread spectrum clock signal and the noise signal, wherein the step of combining comprises alternately coupling of the clock signal between first and second communication channels according to the logic state of the noise signal.

23. The method of claim 22, wherein the noise signal is a random signal.

24. The method of claim 22, wherein the noise signal is a pseudo-random signal.

25. The method of claim 22, further comprising the steps of generating a reference voltage, wherein the step of distributing further comprises selectively alternating each of the first and second communication channels between the clock signal and the reference voltage.

26. Apparatus for reducing electromagnetic interference of a system requiring a clock signal, the circuit comprising:

a clock circuit configured to generate a periodic clock signal;

a first noise generator configured to generate a first noise signal, the first noise generator including a reset port for resetting the first noise generator to a predefined starting state in response to a synchronization signal;

a logic circuit that combines the periodic clock signal and the first noise signal according to a function to generate a spread spectrum clock signal, the spread spectrum clock signal comprising a substantially random waveform;

a single clock distribution bus configured to distribute the spread spectrum clock signal to one or more locations associated with the system; and a clock recovery circuit configured to recover the periodic clock signal from the spread spectrum clock signal at the one or more locations, the clock recovery circuit including a second noise generator for generating a second noise signal, wherein the second noise generator is functionally equivalent to the first noise generator and includes a reset port for resetting the second noise generator to the predefined starting state in response to the synchronization signal, wherein the first noise generator includes an input to receive a rising edge of the periodic clock signal;

the second noise generator includes an input to receive a falling edge of the recovered periodic clock signal; and the logic circuit includes an exclusive-OR logic gate having first and second input terminals coupled to the clock circuit and an output terminal of the first noise generator, respectively, and having an output terminal coupled to the single clock distribution bus.

27. The apparatus of claim 26, wherein the first and second noise signals are identical pseudo-random bit patterns; and the system includes a synchronization circuit to generate the synchronization signal.

28. The apparatus of claim 26, wherein the clock recovery circuit includes an exclusive-OR logic gate having first and second input terminals coupled to the single clock distribution bus and the output terminal of the second noise generator, respectively, and having an output terminal on which the recovered periodic clock signal is output.

29. The apparatus of claim 28, wherein the recovered periodic clock signal has an associated duty cycle, the clock recovery circuit includes a delay element coupled between the output terminal of the second noise generator and the second input terminal of the exclusive-OR logic gate, and the delay element has an associated delay time that determines the duty cycle of the recovered periodic clock signal.

* * * * *